US011776026B1

(12) United States Patent
Jha et al.

(10) Patent No.: US 11,776,026 B1
(45) Date of Patent: Oct. 3, 2023

(54) VIRTUAL NEWSROOM SYSTEM AND METHOD THEREOF

(71) Applicants: Lalit K Jha, Bethesda, MD (US); Om Jha, Bethesda, MD (US)

(72) Inventors: Lalit K Jha, Bethesda, MD (US); Om Jha, Bethesda, MD (US)

( * ) Notice: Subject to any disclaimer, the term of this patent is extended or adjusted under 35 U.S.C. 154(b) by 0 days.

(21) Appl. No.: 17/471,484

(22) Filed: Sep. 10, 2021

(51) Int. Cl.
| *G06Q 30/00* | (2023.01) |
| *G06Q 30/0601* | (2023.01) |
| *G06Q 20/02* | (2012.01) |
| *G06F 16/435* | (2019.01) |
| *G06F 21/16* | (2013.01) |

(52) U.S. Cl.
CPC ....... *G06Q 30/0607* (2013.01); *G06F 16/435* (2019.01); *G06F 21/16* (2013.01); *G06Q 20/027* (2013.01); *G06F 2221/0733* (2013.01)

(58) Field of Classification Search
None
See application file for complete search history.

(56) References Cited

U.S. PATENT DOCUMENTS

| 7,587,352 B2* | 9/2009 | Arnott | G06Q 40/10 705/37 |
| 8,126,882 B2* | 2/2012 | Lawyer | G06F 16/23 707/723 |
| 8,150,842 B2* | 4/2012 | Brougher | G06F 16/9535 707/723 |
| 8,291,492 B2* | 10/2012 | McNally | G06Q 30/0273 705/14.2 |
| 8,645,396 B2* | 2/2014 | McNally | G06F 16/00 705/14.2 |
| 9,519,682 B1* | 12/2016 | Pujara | H04H 60/82 |
| 9,569,467 B1* | 2/2017 | Schechter | G06F 16/24578 |

(Continued)

FOREIGN PATENT DOCUMENTS

| JP | 2001177776 A * | 6/2001 | H04N 5/38 |
| JP | 2008268490 A * | 11/2008 | G09F 19/00 |
| WO | WO-2009002929 A1 * | 12/2008 | G06Q 20/123 |

OTHER PUBLICATIONS

Prof. Dr. Natali Helberger et al. "Implications of AI-Driven Tools in the Media for Freedom of Expression." (Feb. 15, 2020). Retrieved online Mar. 30, 2022. https://rm.coe.int/cyprus-2020-ai-and-freedom-of-expression/168097fa82 (Year: 2020).*

(Continued)

*Primary Examiner* — James A Reagan
(74) *Attorney, Agent, or Firm* — Dave Law Group LLC; Raj S. Dave

(57) ABSTRACT

Embodiments relate to a virtual newsroom system and a method thereof. The method comprises: receiving, through a user registration unit of a virtual newsroom system, a registration of a user; deciding through a registration approving unit of the virtual newsroom system, the registration of the user is approved or rejected; receiving through a content receiving unit of the virtual newsroom system, one or more content from an approved media person; approving, through an approving unit of the virtual newsroom system, the one or more content; publishing, on a publishing unit of the virtual newsroom system, the one or more content; and enabling, through a sales and purchase unit of the virtual newsroom system, sale, purchase and auction of the one or more content.

20 Claims, 28 Drawing Sheets

(56) References Cited

U.S. PATENT DOCUMENTS

| | | | |
|---|---|---|---|
| 9,984,310 B2* | 5/2018 | Hoffman | G06V 10/761 |
| 10,083,295 B2* | 9/2018 | Spurlock | H04L 63/1441 |
| 10,115,109 B2* | 10/2018 | Sundaresan | G06Q 10/063 |
| 10,204,170 B2* | 2/2019 | Viola | G06N 5/04 |
| 10,388,179 B2* | 8/2019 | Mosher | G06Q 10/06393 |
| 10,467,237 B1* | 11/2019 | Silbermann | G06F 16/248 |
| 10,475,100 B1* | 11/2019 | Herz | G06Q 30/0629 |
| 10,552,503 B2* | 2/2020 | Chun | G06Q 10/00 |
| 10,726,297 B2* | 7/2020 | Hoffman | G06V 30/414 |
| 10,747,837 B2* | 8/2020 | Goldenstein | G06F 16/367 |
| 10,747,952 B2* | 8/2020 | Aymeloglu | G06F 3/0484 |
| 10,904,298 B2* | 1/2021 | Sondhi | G06Q 50/10 |
| 11,275,894 B2* | 3/2022 | Ankisettipalli | G06F 16/9024 |
| 11,347,963 B2* | 5/2022 | Hoffman | G06V 30/418 |
| 11,538,213 B2* | 12/2022 | Rowley | G06F 3/013 |
| 2005/0021397 A1* | 1/2005 | Cui | G06Q 30/0251 705/14.42 |
| 2007/0019874 A1 | 1/2007 | Sethuraman et al. | |
| 2007/0174118 A1* | 7/2007 | Dekel | G06Q 30/02 705/14.54 |
| 2008/0097842 A1* | 4/2008 | Tirumala | G06Q 30/0242 705/14.58 |
| 2008/0201156 A1 | 8/2008 | Abhyanker | |
| 2009/0089678 A1* | 4/2009 | Sacco | G06F 16/285 715/733 |
| 2009/0157490 A1* | 6/2009 | Lawyer | G06F 16/9535 707/999.005 |
| 2009/0157667 A1* | 6/2009 | Brougher | G06Q 10/063112 707/999.005 |
| 2009/0165128 A1* | 6/2009 | McNally | G06Q 10/063112 726/21 |
| 2009/0204469 A1* | 8/2009 | Markram | G06F 16/38 707/999.107 |
| 2011/0054959 A1* | 3/2011 | Edwards | G06Q 30/0631 705/26.7 |
| 2011/0258049 A1* | 10/2011 | Ramer | G06Q 30/0273 705/14.69 |
| 2012/0265755 A1* | 10/2012 | McNally | G06Q 30/02 707/723 |
| 2014/0075004 A1* | 3/2014 | Van Dusen | G06Q 30/0201 709/223 |
| 2014/0081954 A1 | 3/2014 | Elizarov | |
| 2014/0337128 A1* | 11/2014 | Carobus | G06Q 30/0251 705/14.52 |
| 2015/0120717 A1* | 4/2015 | Kim | G06F 16/335 707/727 |
| 2015/0120782 A1* | 4/2015 | Kim | G06Q 50/01 707/798 |
| 2016/0371618 A1* | 12/2016 | Leidner | G06Q 10/0635 |
| 2017/0235848 A1* | 8/2017 | Van Dusen | G06N 20/00 705/12 |
| 2018/0239832 A1* | 8/2018 | Galuten | G06F 16/9535 |
| 2019/0156348 A1 | 5/2019 | Levy | |
| 2020/0202071 A1* | 6/2020 | Ghulati | G06Q 50/01 |
| 2020/0202073 A1* | 6/2020 | Ghulati | G06F 40/205 |
| 2021/0056750 A1* | 2/2021 | Rowley | G06T 7/292 |
| 2021/0117417 A1* | 4/2021 | Hendrickson | G06N 20/00 |
| 2023/0082513 A1* | 3/2023 | Rowley | G06F 3/013 |

OTHER PUBLICATIONS

Keldt Schoeman. "Machine Learning Algorithms in Social Media: the Emergence of a Split Subject?" (May 31, 2021). Retrieved online Mar. 30, 2022. https://www.aiethicsjournal.org/10-47289-aiej20210531 (Year: 2021).*

Google News. "Find what you want on Google News." (May 8, 2018). Retrieved online Feb. 13, 2023. https://support.google.com/googlenews/answer/9005601?hl=en&co=GENIE.Platform%3DDesktop (Year: 2018).*

* cited by examiner

VIRTUAL NEWSROOM SYSTEM AND METHOD THEREOF

FIELD OF THE INVENTION

This invention relates to a virtual newsroom system and a method thereof the invention particularly relates to a system and method to enable sale and purchase of content on a single platform.

BACKGROUND

"Systems and methods for determining news veracity are provided. Information may be stored in memory regarding a plurality of media outlets, a plurality of journalists, and a plurality of predefined topics. News content may be received over a communication network. The received news content may be evaluated to identify an associated media outlet, an associated journalist, and at least one associated predefined topic. A current score for each of the associated media outlet, the associated journalist, and the at least one associated predefined topic may be identified based on the stored information. A veracity score may be scored based on the identified current scores for the associated media outlet, the associated journalist, and the at least one associated predefined topic. A display associated with the received news content may be modified based on the generated veracity score." [Source: Method for determining news veracity; Albhy Galuten; published as US20180239832A1 on Aug. 23, 2018]

"Systems and methods are described for automated, user-configurable, unique, hyper personalized and specific to the engagement, objective and/or transaction, rules based human and machine workflow management system. Systems, machine learning, artificial intelligence, and/or natural language processing can be used to identify, review, score, filter, display and categorize various forms of content, communications and collaborations. Human and machine review participants can be automatically provided content for review in a specific subject matter or topic. Distributed ledgers, centralized databases, and/or other computerized machine technologies, can help provide secure attribution and authentication of content as well as management of content review, publishing, editing, collaboration, and compensation contracts. User-configurable transparent scoring of all human, machine and organizations activities provide basis for communications, engagement, collaboration, compensation and terms." [Source: Real-time content analysis and ranking; Robert Hendrickson, Patrick Migliaccio, Michael McNulty, Brian Burrows; published as US20210117417A1 on Apr. 22, 2021]

"The present invention relates to a system and method for verification scoring and/or automated fact checking. More particularly, the present invention relates to automated content scoring based upon an ensemble of algorithms and/or automated fact checking, for example in relation to online journalistic articles, user generated content, blog posts, and user generated comments. Aspects and/or embodiments seek to provide a method of generating a content score for journalistic and other media content, provided with clear protocols and schemata in place and a verifiable method for the reasoning behind the score for such content." [Source: Content scoring; Dhruv Ghulati; published as: US20200202071A1 on Jun. 25, 2020]

"A system and method for generating thematic topics in assisting the compilation and dissemination of user generated content for citizen journalism in context from two or more media sources is provided. A first media source is queried for first topics. The first media source is one of the two or more media sources. The first topics are cross-referenced with a second media source of the one or more media sources. A most popular topic of the first topics is determined among the one or more media sources. The most popular topic has a greatest number of query and cross-reference results among the first topics. The determined most popular topic is associated with a related User Generated Content, UGC and transmitted. The resulting compendium of topics and UGC promotes development of a citizen journalism community and such online favorable reporting remains compatible with professional standards." [Source: Media information system and method; published as US20140081954A1 on Mar. 20, 2014]

"The system and methods described herein provide a way for writers and publishers to stand behind individual and combined facts in their work by offering a bounty to a person who can supersede their own data in support of the fact's accuracy with better data, as measured by a pre-established fact evaluation guideline. Once sufficiently vetted by this system, facts are added to an apolitical certified fact database. Facts in the certified fact database also have a bounty upon their accuracy, however financial responsibility for the bounty is transferred to the system. Subscribers to the system may then download and use fact contained within the certified fact database to enhance their own work, while benefiting from the enhanced readership, interest and trustworthiness provided by virtue of the bounty." [Source: Market-based Fact Verification Media System and Method; David Levy published as US20190156348A1 on May 23, 2019]

"A method, apparatus, and system of a user-generated community publication in a geo-spatial environment are disclosed. In one embodiment, the method includes generating a geo-spatial environment in which residents are represented as users, and in which residents have associated meta-data indicating a physical location and/or an electronic location of the users, processing a user selection of a submit a story idea indicator and/or a become a journalist indicator, processing a submission form when the submit the story idea indicator is selected, and adding a submitted story idea that is geo-tagged to a location identifier of the user to an ideas database, and which remains in the ideas database for a threshold amount of time, transforming a status of a different user to being a community journalist when the different user selects the become the journalist indicator and altering a status of the submitted story idea as being checked out when the community journalist selects the submitted story idea as being one which the community journalist chooses to author." [Source: User-generated community publication in a geo-spatial environment; Raj Vasant Abhyanker published as US20080201156A1 on Aug. 21, 2008]

"A system and method for a standards-based journalism marketplace that allows entrepreneurial journalists to distinguish themselves as professionals operating under professional journalists' code of ethics and sell their content directly to the public. The standards-based journalism marketplace system may include a rating mechanism that allows the public audience to hold journalists accountable to standards of fairness, accuracy, and purity from conflicts of interest and corrupting advertising influences." [Source: System and method for a standards-based journalism marketplace; Gina Edwards, Cathy Zollo published as US20110054959A1 on Mar. 3, 2011]

However, current systems and methods do not provide a single newsroom system where a media person may upload the content and a media outlet may purchase the content. Considering the knowledge of the persons skilled in the art, there is a long-felt need for a single one stop system for enabling the sale and purchase of verified news content as well as verified media persons and media outlets.

SUMMARY

An embodiment relates to a method comprising: receiving, through a user registration unit of a virtual newsroom system, a registration of a user; deciding through a registration approving unit of the virtual newsroom system, the registration of the user is approved or rejected; receiving through a content receiving unit of the virtual newsroom system, one or more content from an approved media person; approving, through an approving unit of the virtual newsroom system, the one or more content; publishing, on a publishing unit of the virtual newsroom system, the one or more content; and enabling, through a sales and purchase unit of the virtual newsroom system, a sale, a purchase, and an auction of the one or more content.

In another embodiment, the user comprises: a media person, a media outlet, an editorial board member, a news auditor, and an ethics committee member.

In another embodiment, the registration of the user, who is a media person, comprises: a language preference, name, email id, password, biodata, a sample of content, resume, references, one or more references of known media persons, one or more social media links; an area of interest, a target audience, a language of content, a location; and receiving payment details through a payment gateway.

In another embodiment, the registration is via one of a signup, endorsement, and an invite.

In another embodiment, the area of interest is used to match with the area of interest of a media outlet and wherein a publishing location for the one or more content is selected based on a majority of the target audience.

In another embodiment, the area of interest is matched by an artificial intelligence technique comprising at least one of a statistical analysis, a machine learning algorithm, and a rule-based analysis.

In another embodiment, deciding the registration is through an artificial intelligence technique comprising at least one of: a statistical analysis, a machine learning algorithm, and a rule-based analysis.

In another embodiment, deciding the registration comprises: deciding the registration of one of a media person and a media outlet.

In another embodiment, deciding the registration is done by one of an editorial board and artificial intelligence techniques.

In another embodiment, deciding the registration of the media person comprises: analyzing and choosing editorial board members by matching the area of interest, the target audience, the language of content and the location of the media person; sending the sample of content, references and social media links to chosen editorial board members; receiving a score from the chosen editorial board members; generating a final score on basis of the score received from the chosen editorial board members; generating a decision for the registration, wherein the decision comprises one of: an approval and a rejection; notifying the media person the decision; and maintaining date and time logs of the registration and the decision of the registration.

In another embodiment, the method comprises: tracking a status of the media person, wherein the status comprises, one of submitted, in review, approved and rejected.

In another embodiment, the method comprises one of: sending a notification if the registration received is one of incomplete and incorrect.

In another embodiment, the notification is through one of a message and an email.

In another embodiment, the method comprises: barring the registration from a rejected media person for a period of time.

In another embodiment, the language of content comprises: English, Portuguese, Polish, Spanish, French, Russian, German, Turkish, Italian, Ukrainian, Greek, Arabic, Swahili, Yoruba, Chinese, Hindi, Indonesian, Bangla, Japanese, Punjabi, Filipino, Korean, Vietnamese, Telugu, Tamil, Urdu, Nepali, Gujarati, Malayalam, Marathi, Hebrew, Thai, Persian, Kannada, Malay, Uzbek, and others.

In another embodiment, the one or more content comprises: a text article, an audio, an image, a video, or a combination, wherein the image comprises: photographs, sketches, charts, and others.

In another embodiment, the content received is geo-tagged with a location from which the content originated.

In another embodiment, the content is authenticated through one or more of news auditors or by an artificial intelligence technique.

In another embodiment, the artificial intelligence technique comprises one of: a statistical analysis, a machine learning algorithm, and a rule-based analysis.

In another embodiment, approving the one or more content comprises: allocating the one or more content to one or more news auditors; submitting the one or more content to the one or more news auditors; receiving first rating of the one or more content; and generating a decision for the one or more content, wherein the decision comprises one of: an approval and a rejection.

In another embodiment, allocating the content to the one or more news auditors depends on a count of content published by the media person.

In another embodiment, the one or more content is authenticated and checked for quality of the one or more content.

In another embodiment, the one or more content is authenticated through a geo-tagged location, and is further checked for plagiarism, fakery, doctoring, obscenity, copy, hate, and alike.

In another embodiment, the one or more content is checked for language consistency, language flow, grammar, texture, contextuality, originality, accuracy, headline and content matching, content addon elements matching, inflammatory quotient, attribution, and credits to sources for quality of the one or more content.

In another embodiment, the one or more content authenticated by geo-tagged location is done through social media links and online databases using an artificial intelligence technique.

In another embodiment, publishing of the one or more content comprises: showing preview of the one or more content with a pricing and a watermark of the virtual newsroom system in background of the one or more content; displaying a first rating of the one or more content; and wherein a watermarked content restricts a media outlet from unauthorised usage of published content.

In another embodiment, the one or more content is published in one or more languages; and wherein the user is a media person that chooses to transcribe or translate the content while uploading the content.

In another embodiment, the publishing of the one or more content comprises: generating a recommendation of a target audience for news based upon the one or more content and a target audience location to the media person; and wherein the one or more content is offered free, sold non-exclusively to two or more media outlets or sold exclusively to a media outlet.

In another embodiment, generating the recommendation is done through an artificial intelligence technique.

In another embodiment, the method comprises: tracking, a count of the one or more content approved by one or more news auditors.

In another embodiment, the one or more news auditors are not assigned more content if a predefined daily limit of the count is reached.

In another embodiment, the registration for a media outlet comprises: receiving media outlet name, email id, password, logo, website link, one or more social media links, one or more preferred content languages; a target audience, an area of interest, and a location where the content is to be published; receiving payment details for membership through a payment gateway; and confirming the registration.

In another embodiment, the media outlet comprises: a newspaper, a periodical, a television, a radio, a newsletter, an online news service and others.

In another embodiment, the enabling of the sale, the purchase and the auction of the one or more content comprises: receiving a search query from a media outlet; displaying a list from a published content according to the search query received; receiving a selection from the list; enabling the purchase; receiving payment details through a payment gateway; placing a logo as a watermark in the one or more content purchased; generating a link to download the published content; and sending the link to the media outlet.

In another embodiment, in case the media outlet is an online news service, the search query and the selection are done by browsing through the published content through an artificial intelligence technique.

In another embodiment, the pricing of the one or more content that is published is dynamically changing for different media outlets.

In another embodiment, the pricing of the one or more content that is published is according to a count of a target audience of the media outlet.

In another embodiment, the search query comprises: keywords for a location, an area of interest, a language, a topic.

In another embodiment, the method further comprises: receiving a first rating of the published content and a second rating of the media person from the media outlet.

In another embodiment, the method comprises: generating a recommendation for the media outlet, according to the search query received; wherein the recommendation is through an artificial intelligence and a machine learning technique; and wherein the artificial intelligence and the machine learning technique learn through history of search queries, matching area of interests of the media person and the media outlet, keywords of location of the one or more content in a database.

In another embodiment, the method further enables receiving an additional requirement through a media outlet; displaying the additional requirement; and receiving one or more entries from a media person.

In another embodiment, the method further comprises: receiving a complaint for the one or more content being unethical; allocating the complaint to an ethics committee member for checking if the one or more content is unethical; sending a notice to the media person if the one or more content is found to be unethical; receiving a corrected one or more content through the media person; and removing the one or more content and the media person from a database, if the one or more content is not corrected.

In another embodiment, the checking is done by an artificial intelligence technique.

In another embodiment, the method further comprises: verifying the one or more content periodically for unethical and plagiarism issues.

In another embodiment, the one or more content comprises: obscene, criminal, violent, offensive, fake and hate content.

In another embodiment, a system, comprising: a memory; and a processor coupled to the memory, wherein the processor is operable to: receive, through a user registration unit, a registration of a user; decide through a registration approving unit the registration of the user is approved or rejected; receive through a content receiving unit, one or more content from an approved media person; approve through an approving unit, the one or more content is authentic or not; publish on a publishing unit the one or more content; enable, through a sales and purchase unit, a sale, a purchase and an auction of the one or more content; and wherein the system is configured to implement a virtual newsroom system.

In another embodiment, the user comprises: a media person, a media outlet, an editorial board member, a news auditor, and an ethics committee member.

In another embodiment, the processor through the user registration unit is operable to: receive a language preference, name, email id, password, biodata, a sample of content, resume, references, one or more references of known media persons, one or more social media links; an area of interest, a target audience, a language of content, a location; and receiving payment details through a payment gateway.

In another embodiment, the receiving the registration is via one of a signup, endorsement, and an invite.

In another embodiment, the area of interest is used to match with the area of interest of the user as a media outlet; and wherein a publishing location for the one or more content is selected based on a majority of the target audience.

In another embodiment, the area of interest is matched by an artificial intelligence technique comprising at least one of: a statistical analysis, a machine learning algorithm, and a rule-based analysis.

In another embodiment, deciding the registration is through an artificial intelligence technique comprising at least one of: a statistical analysis, a machine learning algorithm, and a rule-based analysis.

In another embodiment, the registration of one of a media person and a media outlet is decided through the registration approval unit.

In another embodiment, the registration is decided by one of an editorial board and artificial intelligence techniques.

In another embodiment, the processor through the registration approval unit is further operable to: analyzing and choosing editorial board members, by matching the area of interest, the target audience, the language of content, and the location of the media person; send the sample of content, references, and social media links to chosen editorial board members;

receive a score from each of the chosen editorial board members from each of the chosen editorial board members; generate a final score on basis of the score received; generate a decision; wherein the decision comprises one of: an approval and a rejection; notify the media person the decision; and maintain date and time logs for the registration and the decision of the registration.

In another embodiment, the processor is operable to: track a status of the media person; and wherein the status comprises one of: submitted, in review, approved and rejected.

In another embodiment, the processor is operable to: send a notification to the media person if the registration received is one of incomplete and incorrect.

In another embodiment, the notification is sent through one of a message and an email.

In another embodiment, the processor is operable to: bar the registration from a rejected media person for a period.

In another embodiment, the language of content comprises: English, Portuguese, Polish, Spanish, French, Russian, German, Turkish, Italian, Ukrainian, Greek, Arabic, Swahili, Yoruba, Chinese, Hindi, Indonesian, Bangla, Japanese, Punjabi, Filipino, Korean, Vietnamese, Telugu, Tamil, Urdu, Nepali, Gujarati, Malayalam, Marathi, Hebrew, Thai, Persian, Kannada, Malay, Uzbek, and others.

In another embodiment, the one or more content comprises: text articles, audios, images, videos, or a combination and wherein the images comprise: photographs, sketches, charts, and others.

In another embodiment, the one or more content is geo-tagged with a location from which the content originated.

In another embodiment, the processor through the content approval unit is operable to: allocate the content to one or more news auditors; submit the one or more content to the one or more news auditors; wherein the one or more content is authenticated; receive a score and a first rating of the content; and generate a decision of the content, wherein the decision is one of approved and rejected.

In another embodiment, the one or more content is authenticated through the one or more news auditors or by an artificial intelligence technique comprising at least one of: a statistical analysis, a machine learning algorithm, and a rule-based analysis.

In another embodiment, allocating the content to the one or more news auditors depends on a count of content published by the media person.

In another embodiment, the one or more content is authenticated and checked for quality of the one or more content.

In another embodiment, the one or more content is authenticated through geo-tagged location, and is checked for plagiarism, fakery, doctoring, obscenity, copy, hate, and alike.

In another embodiment, the one or more content is checked for language consistency, language flow, grammar, texture, contextuality, originality, accuracy, headline and content matching, content addon elements matching, inflammatory quotient, attribution, and credits to sources for quality of the one or more content.

In another embodiment, the one or more news auditors are notified if the check is found to be true.

In another embodiment, the processor through the publishing unit is operable to: show preview of the one or more content with a pricing and watermark of the virtual newsroom system in background of the one or more content; display a first rating of the one or more content; and wherein watermarked content restricts a media outlet from unauthorised usage of the published content.

In another embodiment, the one or more content is published in one or more languages; and wherein the media person chooses to transcribe the content while uploading the content.

In another embodiment, the processor is operable to: generate a recommendation of a target audience for news based upon the one or more content and a location to the media person; and wherein the one or more content is offered free, sold non-exclusively to two or more media outlets or sold exclusively to a media outlet.

In another embodiment, generating the recommendation is done through an artificial intelligence technique.

In another embodiment, the processor is operable to: track a count of the one or more content approved by one or more news auditors.

In another embodiment, the processor is operable to: not assign one or more content to the one or more news auditors if a predefined daily limit of the count is reached.

In another embodiment, the processor through the user registration unit is operable to: receive a media outlet name, email id, password, logo, website link, one or more social media links, one or more preferred content languages; a target audience, area of interest, and a location where the content is to be published; and receive payment details for membership through a payment gateway.

In another embodiment, the system is managed by a system administrator.

In another embodiment, the registration is confirmed by a system administrator.

In another embodiment, the media outlet comprises: a newspaper, a periodical, a television, a radio, a newsletter, an online news service and others.

In another embodiment, the processor through the sales and purchase unit is operable to: receive a search query from a media outlet; display a list of published content according to the search query received; receive a selection from the list; enable the purchase; receive payment details through a payment gateway; place a media outlet logo as a watermark in the one or more content purchased; generate a link to download the published content; and send the link to the media outlet.

In another embodiment, in case the media outlet is an online news service the search query and the selection are done by browsing through the published content through an artificial intelligence technique.

In another embodiment, the pricing of the one or more content that is published changes dynamically for different media outlets.

In another embodiment, the pricing of the one or more content that is published is according to a count of a target audience of the media outlet.

In another embodiment, the search query comprises: keywords for a location, an area of interest, a language, a topic.

In another embodiment, the processor is operable to: receive a first rating of the published content and a second rating of the media person from the media outlet.

In another embodiment, a system administrator invites editorial board members, one or more news auditors and ethics committee members for the registration on the virtual newsroom system.

In another embodiment, the processor is operable to: generate a recommendation for the media outlet according to the search query received; wherein the recommendation generated are matched through artificial intelligence and machine learning techniques; and wherein the artificial intelligence and the machine learning techniques learn through history of search queries, matching area of interests of the media person and the media outlet, keywords of location of the one or more content in a database.

In another embodiment, the processor through the sales and purchase unit is operable to: receive an additional requirement through the media outlet; display the additional requirement; and receive one or more entries from the media person.

In another embodiment, the processor is operable to: receive a complaint for the one or more content being unethical; allocate the complaint to an ethics committee member for a checking if the one or more content is unethical; send a notice to the media person if the one or more content is found to be unethical; receive a corrected one or more content through the media person; and remove the one or more content and the media person from a database, if the one or more content is not corrected; and verify the one or more content periodically for unethical or plagiarized content.

In another embodiment, the checking is done by an artificial intelligence technique.

In another embodiment, the processor is operable to: conduct periodic checks for one or more of unethical and plagiarism issues.

In another embodiment, unethical or plagiarized content comprises at least one of: obscene, criminal, violent, offensive, fake and hate content.

In another embodiment, a non-transitory computer storage medium storing a sequence of instructions, which when executed by a processor, causes: receiving, through a user registration unit of a virtual newsroom system, a registration of a user; deciding through a registration approving unit of the virtual newsroom system, the registration of the user is approved or rejected; receiving through a content receiving unit of the virtual newsroom system, one or more content from an approved media person; approving, through an approving unit of the virtual newsroom system, the one or more content; publishing, on a one or more publishing unit of the virtual newsroom system, the one or more content; and enabling, through a sales and purchase unit of the virtual newsroom system, a sale, a purchase, and an auction of the one or more content.

BRIEF DESCRIPTION OF THE FIGURES

The embodiments of this invention are illustrated by way of example and not limitation in the figures of the accompanying drawings, in which like references indicate similar elements and in which:

FIG. 6C illustrates an example of allocating the one or more content to the one or more news auditors.

FIG. 6D illustrates tracking of count of one or more content allocated to news auditors, according to one or more embodiments.

DETAILED DESCRIPTION

Figure 1:
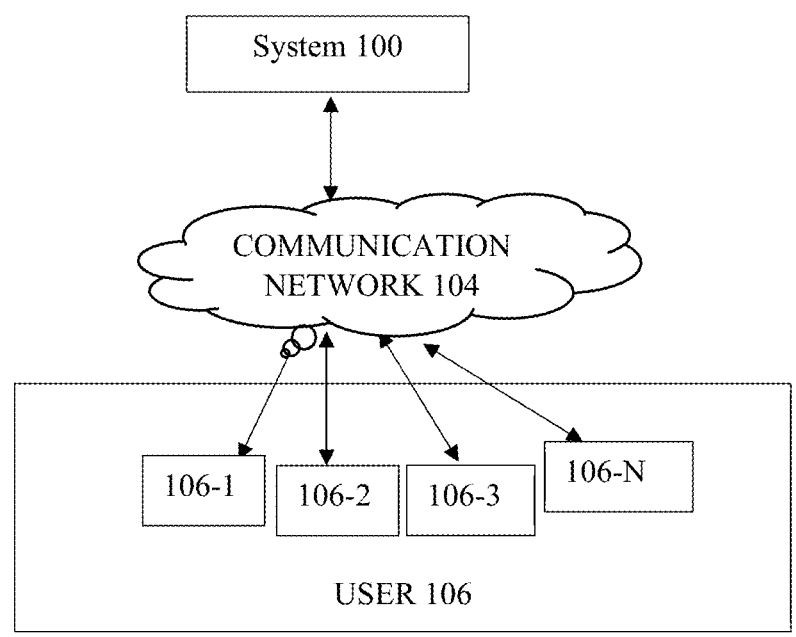
FIG. 1 illustrates a network implementation of a virtual newsroom system, according to one or more embodiments.

The articles "a" and "an" are used herein to refer to one or to more than one (i.e., to at least one) of the grammatical object of the article. By way of example, "an element" means one element or more than one element.

No element, act, or instruction used herein should be construed as critical or essential unless explicitly described as such. Also, as used herein, the articles "a" and "an" are intended to include items and may be used interchangeably with "one or more." Furthermore, as used herein, the term "set" is intended to include items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The term "comprising", which is synonymous with "including", "containing", or "characterized by" here is defined as being inclusive or open-ended, and does not exclude additional, unrecited elements or method steps, unless the context clearly requires otherwise.

As used herein, the term "component" is intended to be broadly construed as hardware, firmware, and/or a combination of hardware and software.

As used herein, the term "API" stands for Application Programming Unit. It is a unit that defines interactions between multiple software applications or mixed hardware-software intermediaries. It defines the kinds of calls or requests that can be made, how to make them, the data formats that should be used, the conventions to follow, etc. It can also provide extension mechanisms so that users can extend existing functionality in various ways and to varying degrees. An API can be entirely custom, specific to a component, or designed based on an industry-standard to ensure interoperability. Through information hiding, APIs enable modularity, allowing users to use the unit independently of the implementation. Web APIs are now the most common meaning of the term API. There are also APIs for programming languages, software libraries, computer operating systems, and computer hardware.

As used herein, the term "IoT" stands for Internet of Things which describes the network of physical objects "things" or objects that are embedded with sensors, software, and other technologies for the purpose of connecting and exchanging data with other devices and systems over the internet.

As used herein "Machine learning" refers to algorithms that give a computer the ability to learn without being explicitly programmed including algorithms that learn from and make predictions about data. Machine learning algorithms include, but are not limited to, decision tree learning, artificial neural networks (ANN) (also referred to herein as a "neural net"), deep learning neural network, support vector machines, rule-based machine learning, random forest, etc. For the purposes of clarity, algorithms such as linear regression or logistic regression can be used as part of a machine learning process. However, it is understood that using linear regression or another algorithm as part of a machine learning process is distinct from performing a statistical analysis such as regression with a spreadsheet program. The machine learning process can continually learn and adjust the classifier as new data becomes available and does not rely on explicit or rule-based programming.

As used herein, the term "Dashboard" is a type of unit that visualizes particular Key Performance Indicators (KPIs) for a specific goal or process. It is based on data visualization and infographics, so it is linked to a database that allows constant updates. In some situations, the same term is used for progress reports.

As used herein, a "Database" is a collection of information that is organized so that it can be easily accessed, managed, and updated. Computer databases typically contain aggregations of data records or files.

As used herein, the term "Cloud" refers to servers that are accessed over the Internet, and the software and databases that run on those servers. Cloud servers are located in data centers all over the world. By using cloud computing, users and companies don't have to manage physical servers themselves or run software applications on their own machines.

Implementations may be realized in a computing system that includes a back-end component, e.g., as a data server, or that includes a middleware component, e.g., an application server, or that includes a front-end component, e.g., a client computer having a graphical user unit or a Web browser through which a user may interact with an implementation, or any appropriate combination of one or more such back-end, middleware, or front-end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Embodiments of the present invention may comprise or utilize a special purpose or general-purpose computer including computer hardware. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described. Rather, the described features and acts are disclosed as example forms of implementing the claims.

Processors suitable for the execution of a computer program include, by way of example, both general and special purpose microprocessors, and any one or more processors of any appropriate kind of digital computer. Generally, a processor will receive instructions and data from a read only memory or a random-access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, optical disks, or solid-state disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., Erasable Programmable Read-Only Memory (EPROM), Electronically Erasable Programmable Read-Only Memory (EEPROM), and flash memory devices; magnetic disks, e.g., internal hard disks or removable disks; magneto optical disks; and Compact Disc Read-Only Memory (CD ROM) disks, Digital Versatile Disk-Read Only Memory (DVD-ROM) disks and solid state disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

In order to fully understand the scope of the invention, the following terms used herein are hereby defined.

The term "comprising", which is synonymous with "including", "containing", or "characterized by" here is defined as being inclusive or open-ended, and does not exclude additional, unrecited elements or method steps, unless the context clearly requires otherwise.

The term "device" is defined as an electronic element that cannot be divided without destroying its stated function.

The term "server" is defined as a computer that manages network resources.

The term "communicatively coupled" is defined as devices connected in a way that permits communication.

The term "configured" is defined as arranged within the system to perform certain functions.

The term "receiving" is defined as being given information.

The term "generating" is defined as creating information.

The term "recommendations" refers to the suggestions generated by the system by analyzing the enquiry.

The term "real time" relating to a system in which input data is processed within milliseconds so that it is available virtually immediately as feedback to the process from which it is coming, The term "memory" is defined as any device in which information can be stored.

The term "execute" is defined as run or launch.

The term "instructions" is defined as a software program or machine executable code.

The term "processor" is defined as a component in the server for executing instructions stored in memory.

The term "media person" is defined as a person who reports about factual events for earning a living. The reporting may be writing, video reporting, photography, and photo stories. A media person may be a reporter, an announcer, a journalist, or a broadcaster.

The term "media outlet" is defined as a broadcasting channel providing news, information, and feature stories to the public by way of newspapers, magazines, social media, the Internet, television, and radio.

The term "editorial board member" is defined as a media person with a predefined experience in the field of writing, video reporting, photography, and photo stories in various areas of interest.

The term "area of interest" is defined as the field in which a user is experienced. The area of interest may be such as current affairs, politics, sports, regional news, weather forecast, photo and video articles, entertainment, technology, business, economics and alike.

The term "news auditor" is defined as the media person with a predefined years of experience in the field of writing, video reporting, photography, and photo stories in various areas of interest.

The term "ethics committee member" is defined as a member of an ethics committee to check if the content is ethical.

The term "content" is defined as a work submitted by the media person. The content may be a text article, an audio, an image, a video, or a combination, wherein the image comprises: photographs, sketches, charts, and others.

The term "sample content" is defined as the sample of the work submitted by the media person. The sample content may be a text article, an audio, an image, a video, or a combination, wherein the image comprises: photographs, sketches, charts, and others.

The term "barring/bar the registration" is defined as not allowing the media person to register on the virtual newsroom system for a time period.

Example embodiments, as described below, may be used in a virtual newsroom system and method thereof. It will be appreciated that the various embodiments discussed herein need not necessarily belong to the same group of embodiments and may be grouped into various other embodiments not explicitly disclosed herein. In the following description, for purposes of explanation, numerous specific details are set forth in order to provide a thorough understanding of the various embodiments.

Implementations and all of the functional operations described in this specification may be realized in digital electronic circuitry, or in computer software, firmware, or hardware.

A software program (also known as a program, software, executable code, or instructions) may be written in any appropriate form of programming language, including compiled or interpreted languages, and it may be deployed in any appropriate form, including as a standalone program or as a module, component, subroutine, or other unit suitable for use in a computing environment.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described should not be understood as requiring such separation in all implementations, and it should be understood that the described program components and systems may generally be integrated together in a single software product or packaged into multiple software products.

Even though particular combinations of features are recited in the claims and/or disclosed in the specification, these combinations are not intended to limit the disclosure of possible implementations. Other implementations are within the scope of the following claims. For example, the actions recited in the claims may be performed in a different order and still achieve desirable results. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Generally, a media person may interact with the media outlet directly or through a system for the sale of one more content. The content received from the media person may be or may not be authentic content. The content received by the system needs to be verified before publication. There is a need for a system which provides verified media persons to showcase their capabilities through their content, verification of the contents and also the sales and purchase of the content.

In an aspect, the present disclosure discloses a virtual newsroom system. The virtual newsroom system comprises: receiving registration from a user, checking the registration received and deciding whether the registration is approved or rejected. Upon approval the user if a media person may upload one or more content which is verified and published for sale. The user as a media outlet may register and search for published content. The media outlet may purchase the published content.

FIG. 1 shows a network implementation of a virtual newsroom system 100, in accordance with an embodiment of the present subject matter may be described. In one example, the system 102 may be connected with a user 106-1 through 106-N (collectively referred as 106) through a communication network 104.

It should be understood that the system 100, the user 106 correspond to computing devices. It may be understood that the server may be a network server. The server may comprise a web server, web application server and a server database. It may be understood that the system 100 may also be implemented in a variety of computing systems, such as a laptop computer, a desktop computer, a notebook, a workstation, a mainframe computer, a cloud-based computing environment, or a smartphone and the like. It may be understood that the user 106 may access the system 100 a variety of a variety of portable computing devices, such as a laptop computer, a desktop computer, a notebook, a smartphone, a tablet, a phablet, and the like.

The components of the system 100 may be interconnected by any appropriate form or medium of digital data communication, e.g., a communication network. Examples of communication networks include a local area network ("LAN") and a wide area network ("WAN"), e.g., the Internet.

Figure 2A:
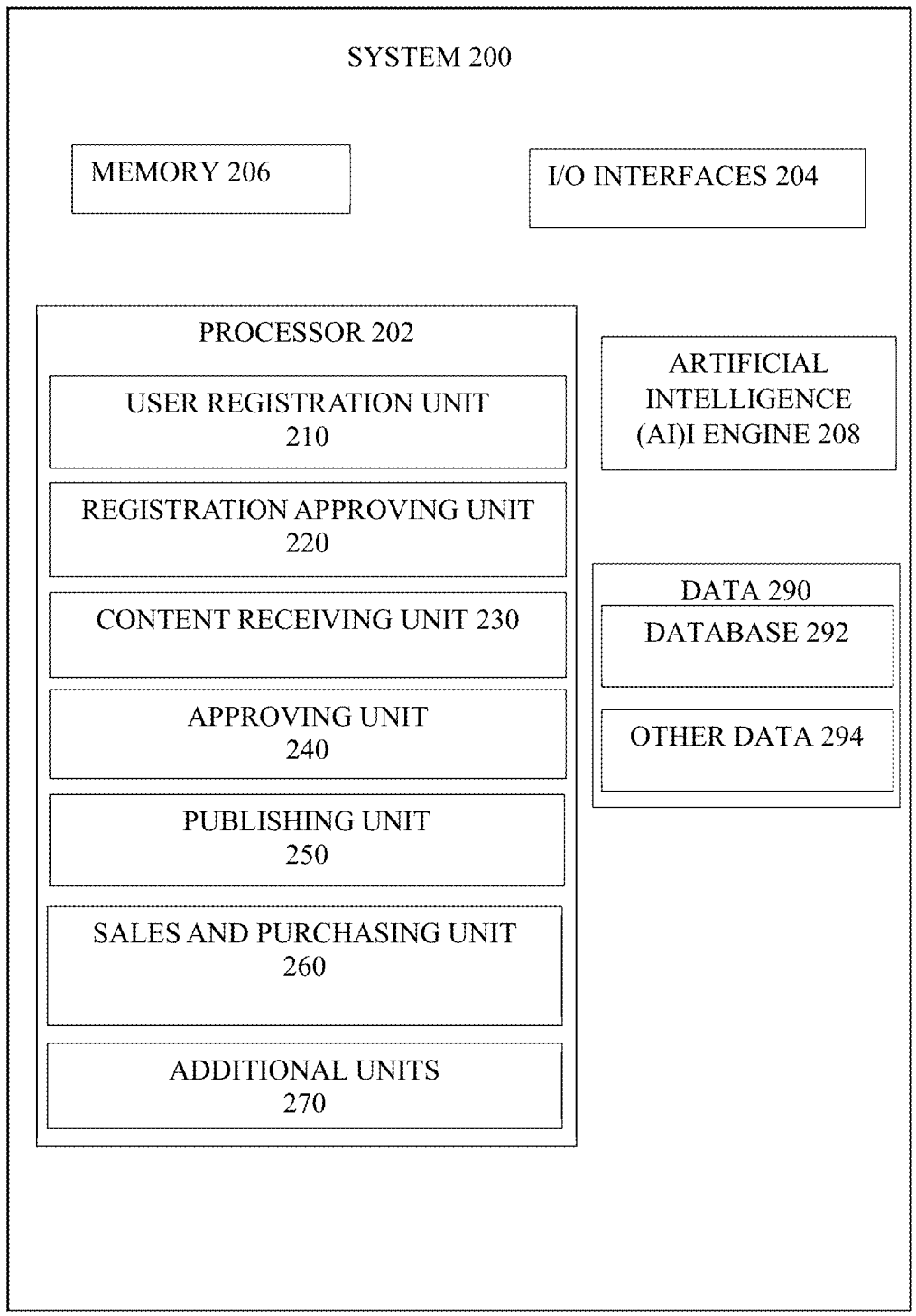
FIG. 2A illustrates a block diagram of the virtual newsroom system, according to one or more embodiments.

FIG. 2A illustrates a block diagram of the virtual newsroom system 200, according to one or more embodiments.

The system 200 disclosed herein comprises: a memory 206, a processor 202, Input Output (I/O) interfaces 204 and an Artificial Intelligence (AI) engine 208. The processor 202 is communicatively coupled to the memory 206 Input Output (I/O) interfaces 204 and an Artificial Intelligence (AI) engine 208. The system 200 also comprises data 290. The processor 202 may take the form of a single core processor, multi-core processor (e.g., a dual core processor, triple core processor, quad core processor, etc.), microprocessor, etc. In some embodiments, the processor 202 may be external to an apparatus (e.g., server), for example the processor 202 may be a remote processor (e.g., a cloud-based processor). Alternatively, or additionally, the processor 202 may be internal and/or local to the apparatus. The Artificial Intelligence (AI) engine 208 may utilize a statistical analysis, a machine learning algorithm, artificial intelligence, or a rule-based analysis technique to generate recommendations. The system 200 further comprises: a user registration unit 210, a registration approving unit 220, a content receiving unit 230, an approving unit 240, a publishing unit 250, a content sales and purchase unit 260 and additional units 270.

The data 290 may include a repository 292 for storing data processed, computed, received, and generated by one or more of the units. Furthermore, the data 290 may include other data 294 for storing data generated as a result of the execution of units than the ones mentioned above.

Figure 2B:
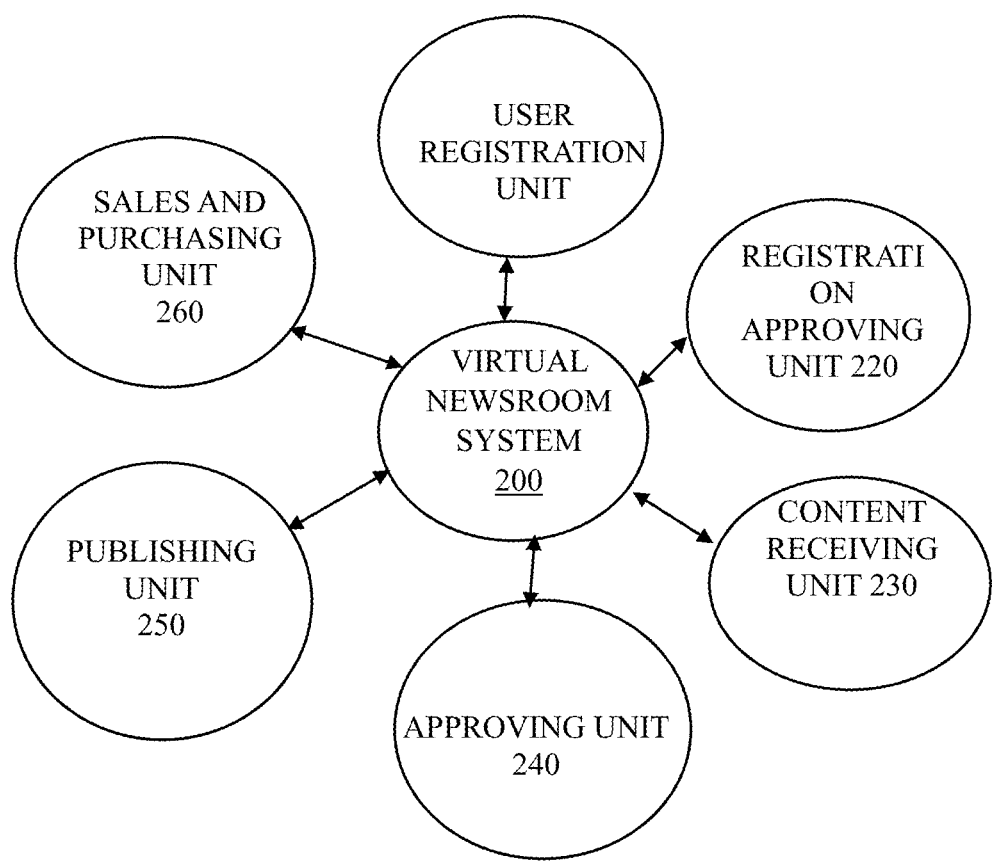
FIG. 2B illustrates a schematic diagram of the virtual newsroom system, according to one or more embodiments.

FIG. 2B illustrates the schematic diagram of the virtual newsroom system. The virtual newsroom system 200 communicates individually with each of the units through the processor 202. The system 200 may be managed by a system administrator. A system administrator may be an individual or artificial intelligence technique managing the virtual newsroom system. The artificial intelligence technique comprises: a statistical analysis, a machine learning algorithm, or a rule-based analysis.

Figure 3A:
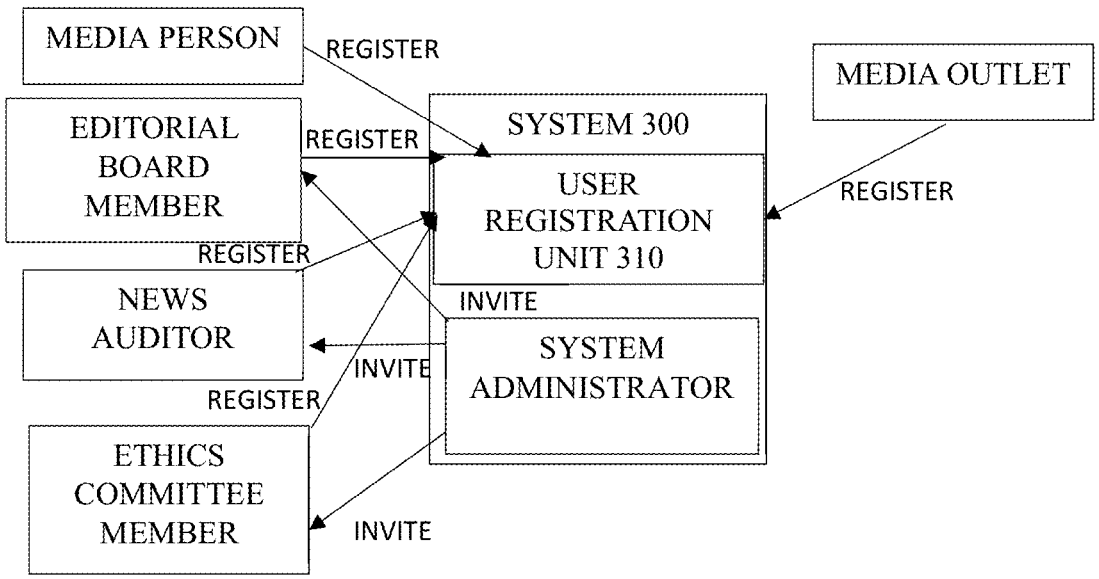
FIG. 3A-3B illustrates a block diagram of a registration from a user, according to one or more embodiments.

FIG. 3A shows the schematic of the user registration unit 310. The user registration unit 310 receives a registration from a user. The user is an individual interacting with the virtual newsroom system 300. The user for the virtual newsroom system may be a media person, a media outlet, an editorial board member, a news auditor, and an ethics committee member. The system administrator may invite the user for registration. The registration also may be received through a signup in the system 300, and the media outlet, news auditor or the editorial board member may endorse a media person to register on the virtual newsroom system 300.

For Example, the news auditor may recommend a media person X to register on the virtual newsroom system. Similarly, the news auditor may recommend the media person X to register on the virtual newsroom system. The media person may be given one point for every endorsement. The system may send a request to the media person X to register on the virtual newsroom system, when the system receives ten points for the media person X.

The user registering through the invite, or the endorsement may not require an approval to get access to the virtual newsroom system 300.

Figure 3B:
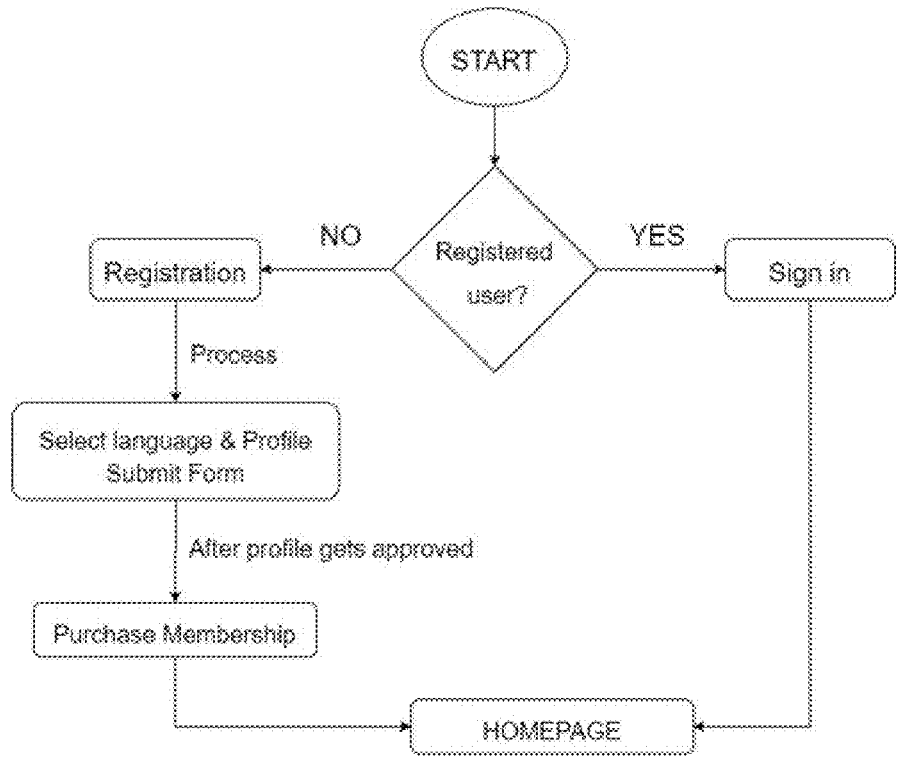

FIG. 3B shows a flow chart of registration of a media person. At Step 311 in case the registration received is of a media person, the registration comprises a language preference for the system. At step 312, a type of user is received, here the type of user received is a media person. At step 313, a name, an email id, password, and a photograph of the media person is received. At step 314, a biodata, a sample of content, and a resume is received. The sample of content may be a text article, an audio, an image, a video, or a combination, wherein the image comprises: photographs, sketches, charts, and others. At step 315, one or more references of known media persons, one or more social media links is received. The social media links may be social media account links or handles comprising sites: Twitter, LinkedIn, Facebook, Instagram, and others. At step 316, an area of interest, target audience, a language of content, a location of the media person is received. The language of content may comprise the language of content comprises: English, Portuguese, Polish, Spanish, French, Russian, German, Turkish, Italian, Ukrainian, Greek, Arabic, Swahili, Yoruba, Chinese, Hindi, Indonesian, Bangla, Japanese, Punjabi, Filipino, Korean, Vietnamese, Telugu, Tamil, Urdu, Nepali, Gujarati, Malayalam, Marathi, Hebrew, Thai, Persian, Kannada, Malay, Uzbek, and others. At step 317, after receiving the registration, payment details are received through a payment gateway. The payment gateway used here may be a third-party payment gateway, or a payment gateway developed for the system 300. At step 318, on receiving the payment details, the registration is confirmed by the system 300.

In an exemplary embodiment, in case the registration is received as a media person, an email id received is in a format for an email id, for example davejohnson@xyz.com. The system may receive a password. The password received may contain a minimum of eight characters, an upper-case alphabet, lower-case alphabet, a special character and a digit, for example qWeRty@123. The system 300 may receive a photograph. The photograph may be up to the size of 2 MB(Megabyte). The system may receive the full name of the media person i.e. the first name, middle name (optional) and a last name, for example Name is received as Dave Johnson. The name received may have a maximum of 50 characters. A phone number may be received by the system 300. Maximum of 11 digits are allowed for the phone number. The phone number is verified by one time password authentication. The system may receive a location which contains the region, state, and country for which a media person would like to work from and target the location for generating content. The system may receive the language of content. There may be one or more languages of content in which the media person wishes to publish one more content. The system 300 may receive areas of interest for the one or more content. The area of interest may be various areas such as current affairs, politics, sports, regional news, weather forecast, photo and video articles, entertainment, technology, business, economics and alike. There may be one or more areas of interest received. The resume received may be in a .pdf, .doc, .docx or alike format. The resume may be received up to 2 MB(Megabyte) in size. The system may receive one or more references of people who know the media person. The references may contain a name, a designation, an email, and a phone number for each reference. The system may receive at least three references. The system may receive a sample of content. The sample of content may be previously published content. There may be at least three samples of content received. The social media links may be social media account links or handles comprising sites: Twitter, LinkedIn, Facebook, Instagram, and others. The target audience received by the system is based on a preferred media outlet for publishing, a location, the area of interest and the language of content. A biodata is received by the system which may have about 150 words or a short video up to 15 MB, where the media person may provide a brief introduction about himself and his work experience.

Figure 3C:
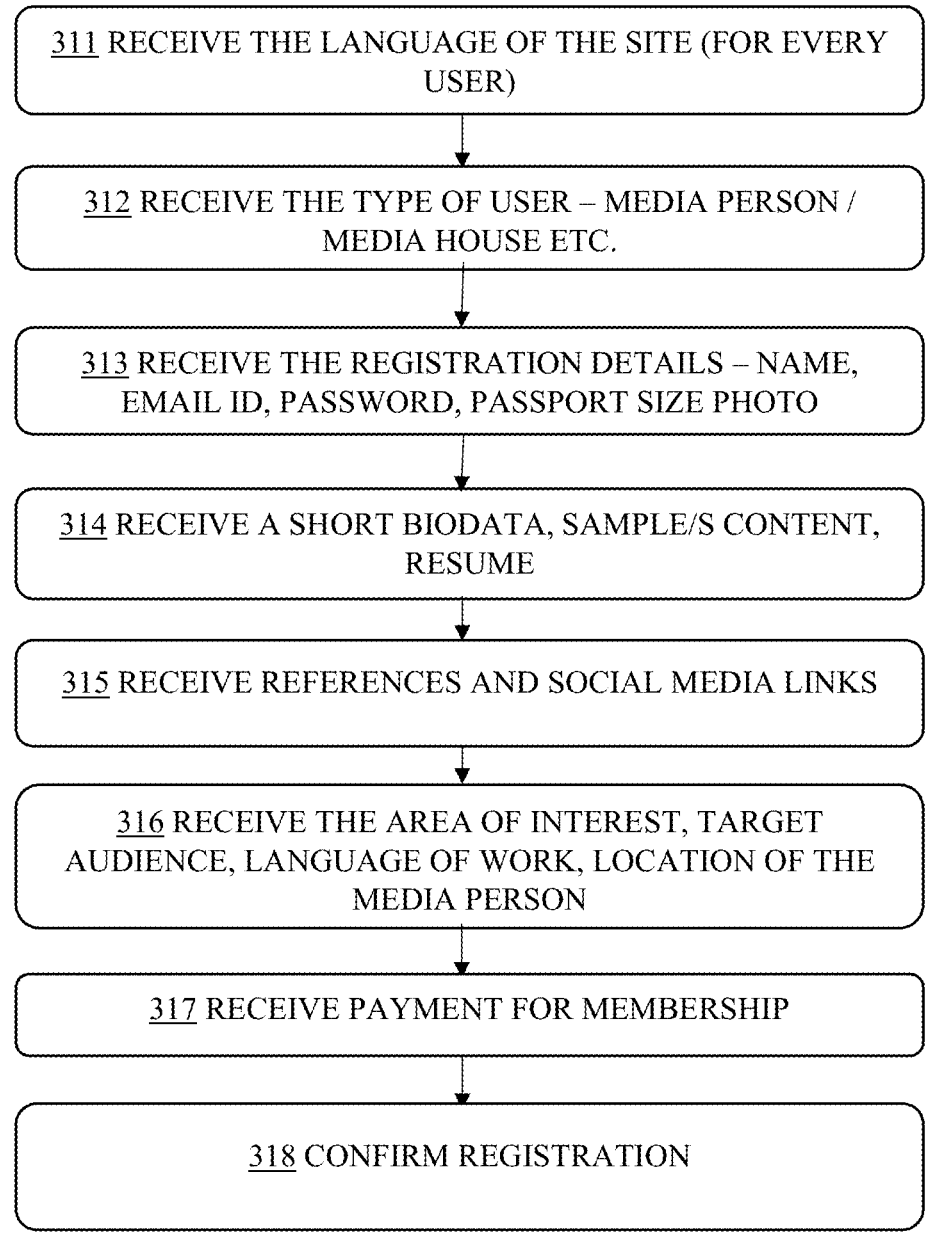
FIG. 3C illustrates a flow chart of registration of a media person, according to one or more embodiments.
Figure 3D:
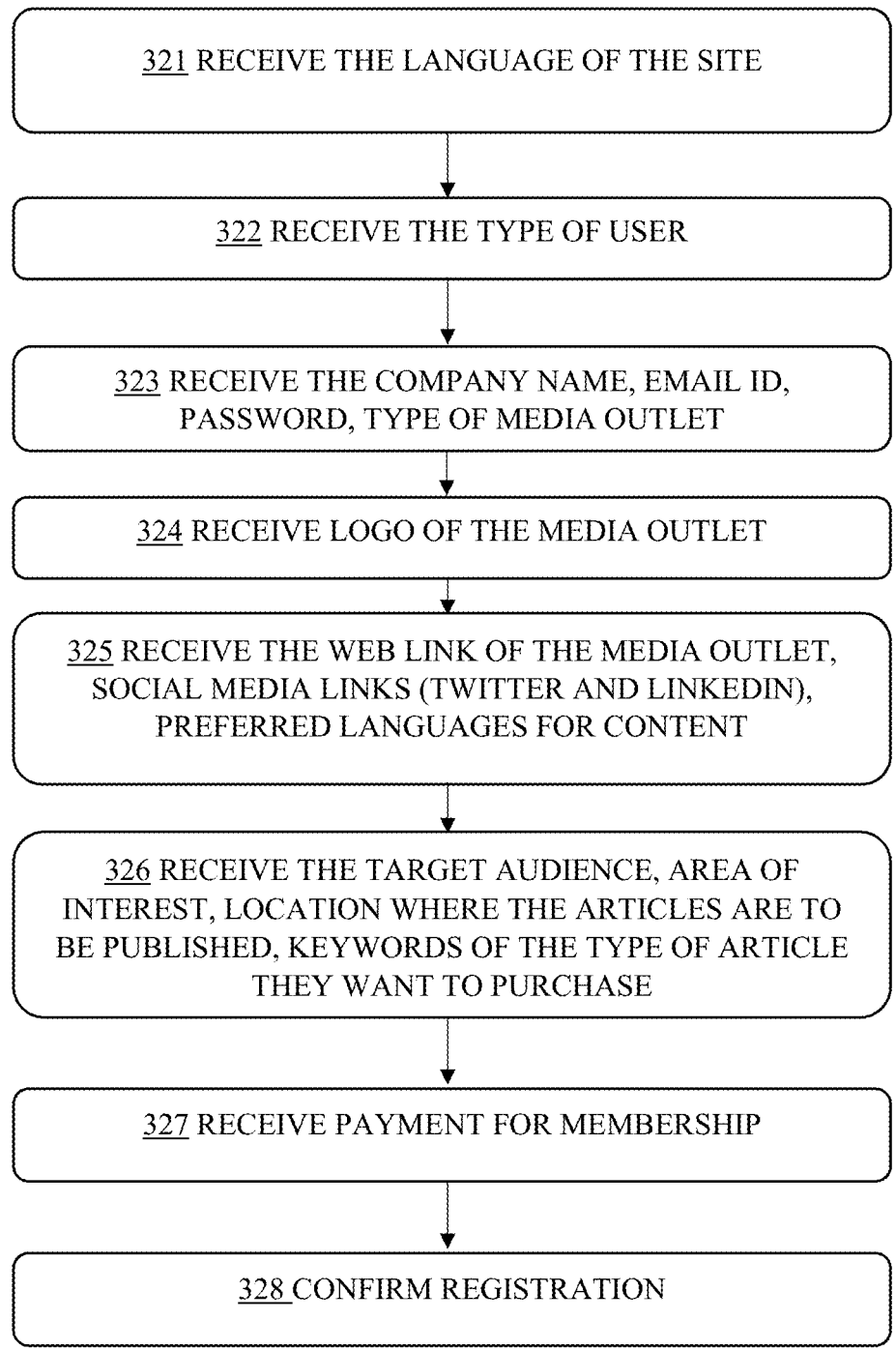
FIG. 3D illustrates a flow chart of registration of a media outlet, according to one or more embodiments.

FIG. 3C shows the registration of a media outlet. At step 321, a language preference is received by the system. At step 322, a type of user is received; here the type of user received is a media outlet. At step 323, a media outlet name, email id, password is received. At step 324, a logo of the media outlet is received. At step 325, website link, one or more social media links, and one or more preferred content languages are received. At step 326, a target audience, an area of interest, and a location where the content is to be published is received. At step 327, upon receiving the registration as the media outlet, payment details are received. At step 328, the registration is confirmed after receiving the payment details. The media outlet may be any media outlet comprising: a newspaper, a periodical, a television, a radio, a newsletter, an online news service and others. The area of interest is used to match with the area of interest of the user as a media outlet; and wherein the location for publishing the one or more content is selected based on a majority of the target audience.

In an exemplary embodiment, in case the registration is received as a media outlet, an email id received is in a format for an email id, for example xyz@newyorktimes.com. The system may receive a password. The password received may contain a minimum of eight characters, an upper-case alphabet, lower case alphabet, a special character and a digit, for example qWeRty@123. The system 300 may receive a logo of the media outlet. The media outlet logo may be up to the size of 2 MB. The system may receive a name of the media outlet, for example Name is received as New York Times. The name received may have a maximum of 50 characters. A phone number may be received by the system 300. Maximum of 11 digits are allowed for the phone number. The phone number is verified by one time password authentication. The system may receive a location which contains the region, state, and country for which a media outlet would like to publish and target the location for generating content. The system may receive the language of content. There may be one or more languages of content in which the media outlet wishes to publish one more content. The system 300 may receive areas of interest for the one or more content. The area of interest may be various areas such as current affairs, politics, sports, regional news, weather forecast, photo and video articles, entertainment, technology, business, economics and alike. There may be one or more areas of interest received. The social media links may be social media account links or handles comprising sites: Twitter, LinkedIn, Facebook, Instagram, and others. The target audience received by the system is based on a preferred media outlet for publishing, a location, the area of interest and the language of content. A biodata is received by the system which may have about 150 words or a short video up to 15 MB, where the media outlet may provide a brief introduction about the media outlet and experience of the media outlet.

In an embodiment, the processor 302 is configured to send a notification if the registration received is incomplete or incorrect. The notification is sent through a message or through an email.

Figure 4A:
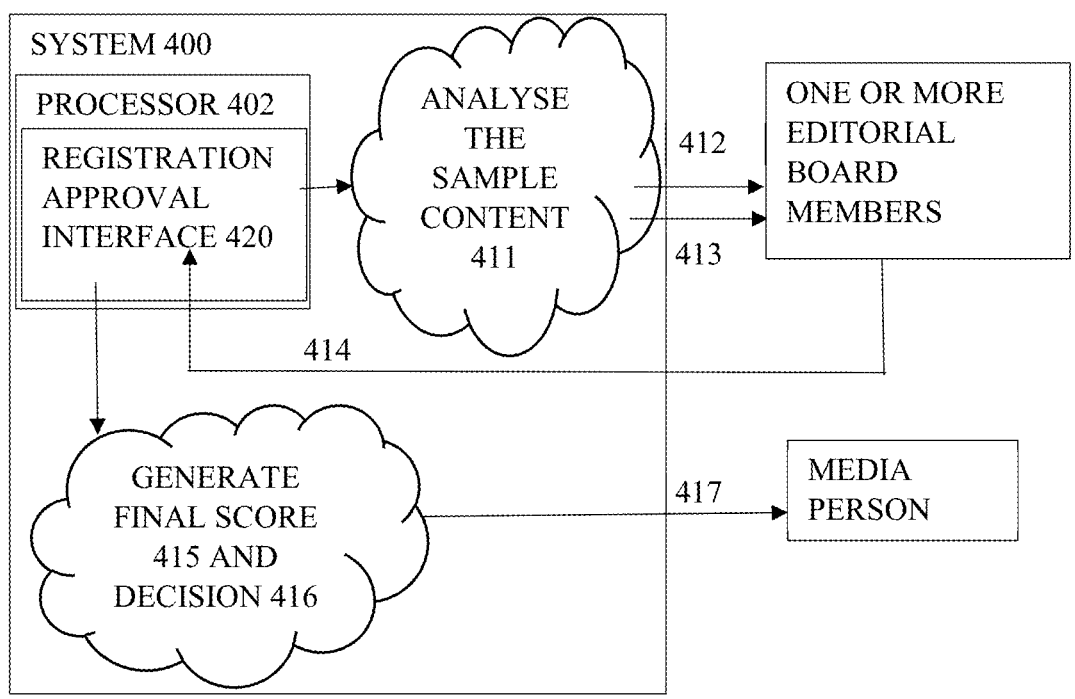
FIG. 4A-4B illustrate a schematic diagram of registration approval of the media person, according to one or more embodiments.
Figure 4B:
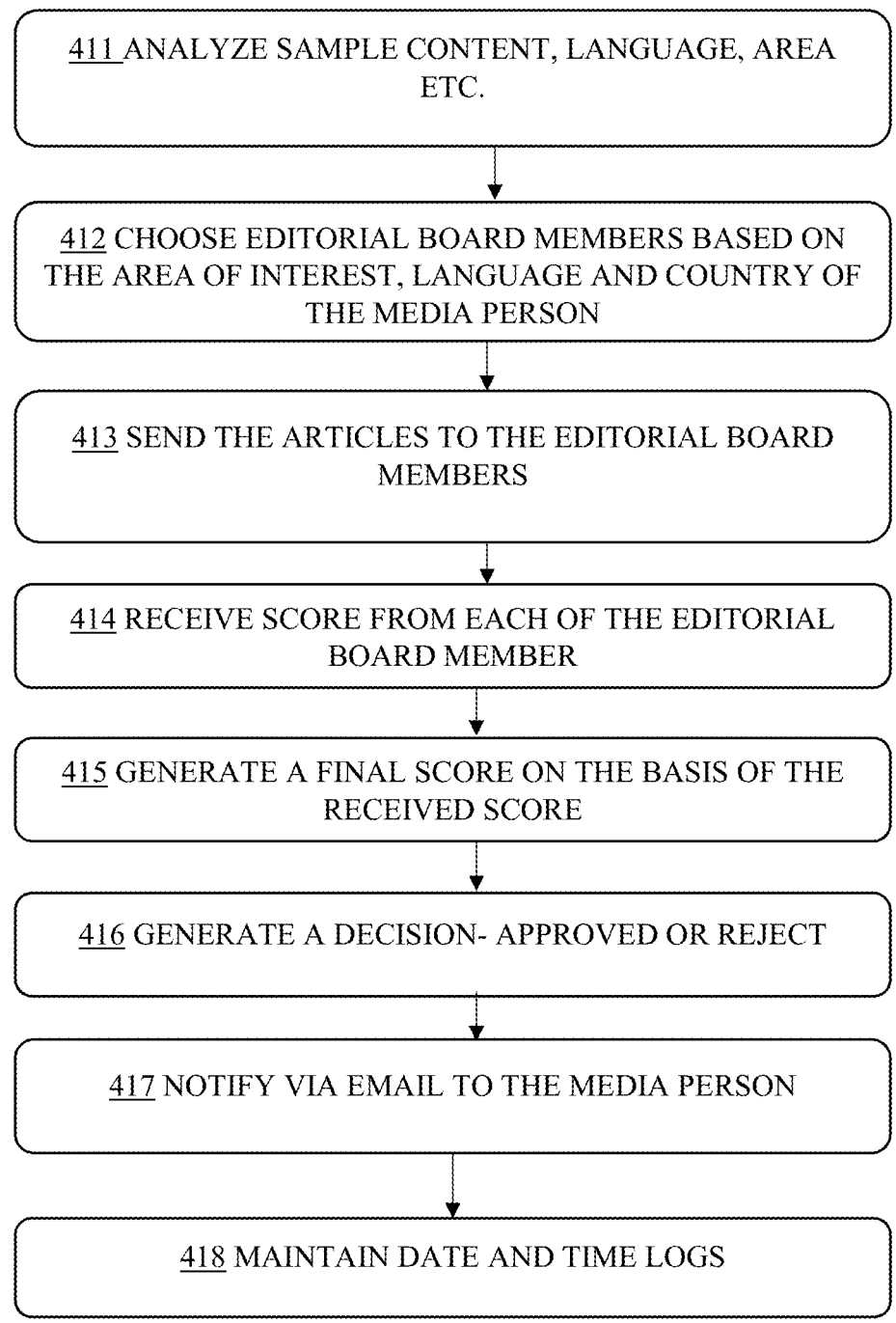

Referring to FIG. 4A-4B illustrates the schematic of a decision on the media person. The processor 402 through the registration approval unit 420, is configured to decide whether the registration is to be approved or rejected. At step 411 and 412, the processor 402 is configured to analyze the registration received and choose one or more editorial board members. The registration is analyzed, and the one or more editorial board members are chosen by matching the area of interest, the target audience, the language of content, and the location of the media person. The one or more editorial board members are experts in the field of media in the area of interest comprising various areas such as current affairs, politics, sports, regional news, weather forecast, photo and video articles, entertainment, technology, business, economics and alike. The one or more editorial board members may have a minimum experience in the area of interest. For example, the editorial board member may have an experience of 20 years in economics or any other area of interest. At step 413, the sample of content, references and social media links are sent to chosen editorial board members for a decision.

For example, the registration of a media person when analyzed, the area of interest is found to be sports, the target audience is in the US, the language of content is English and Spanish, and the location of the media person is New Jersey. So the editorial board members to be chosen are from the area of interest of sports, particularly from the US and should know the language English and Spanish. After choosing the one or more editorial board members, the sample of content, references and social media links are sent to chosen editorial board members. For example, five editorial board members are chosen in the area of interest of sports in the US and are sent the sample of content, references, and social media links.

The one or more chosen editorial board members checks the sample of content and analyzes the sample of content. Cross check the references, contact the reference for authenticating the references provided. The social media links are cross checked by the one or more chosen editorial board members. The editorial board members may also contact the media person if needed. The one or more chosen editorial board members then score the media person on the basis of the analysis.

At Step 414, the system 400 by the processor 402 receives a score from each of the chosen editorial board members. At step 415, the processor 402 generates a final score on the basis of the score received. At step 416, based upon the final score generated, the processor 402 generates a decision for the media person. The decision comprises: an approval or a rejection. For example, the processor 402 may receive the score from each of the chosen five editorial board members. If the majority of the chosen editorial board members have approved the media person i.e., at least three out of five chosen editorial board members have approved the media person. The decision generated by the processor 402 may be as approved. At step 417, the media person is notified of the decision via a message or an email. At step 418, the date and time logs of the registration and the decision of the registration are maintained.

In an embodiment, according to the date and time logs, the media person with the decision as rejected is barred to register again for a pre-defined period of time. For example, the predefined period of time may be from 6 months to one year.

In an embodiment, the processor 402 through the registration approval unit 420, is configured to decide by artificial intelligence technique through an AI engine 490 whether the registration is to be approved or rejected. The processor 402 is configured to analyze the registration received through the AI engine. The AI engine scans through the sample of content, and analyzes the sample of content. Cross check the references, contact the reference for authenticating the references provided. The social media links are cross checked by the AI engine. The artificial intelligence technique comprises: a statistical analysis, a machine learning algorithm, or a rule-based analysis. The AI engine scores the media person upon the analysis. The processor 402 receives the scores from the AI engine. The processor 402 generates a final score on the basis of the score received. Based upon the final score generated, the processor 402 generates a decision for the media person. The decision comprises: an approval or a rejection.

Figure 5:
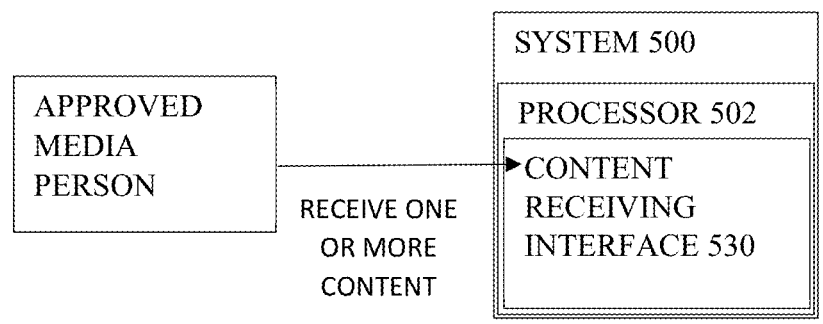
FIG. 5 illustrates a schematic diagram of a content receiving unit, receiving content from the media person, according to one or more embodiments.

FIG. 5 shows the schematic of content receiving unit 530. The processor 502 is configured to receive the one or more content from an approved media person. The approved media person is the media person that is approved by the registration approving unit 420. The one or more content received by the content receiving unit 530 comprises: text articles, audios, images, videos or a combination and the images comprise: photographs, sketches, charts, and others. The text articles may comprise writeups on the area of interest of the media person. There may be a predefined number of images, audio and videos allowed. A time length may be fixed for the audio and videos received. The one or more content received is geo-tagged with a location from which the content originated.

For Example, the text article is received. Images that are received may be up to five images. The videos received may be up to three videos per media person. The time length for at least two videos received may be of 30 seconds each and one of 60 seconds. There may be three videos allowed per media person.

In an embodiment, an approved media person may manage one or more content. The media person may edit the one or more content by adding or deleting the one or more content in the system 500. The media person also can view and edit the registration. The media person may be allowed to upload blogs and other content. The media person also may chat with the editorial board member, news auditors and ethics committee member when required. The media person can collaborate with other media persons for the one or more content. The media person may be able to view the one or more content by other media persons, however they may not be able to view the full content.

Figure 6A:
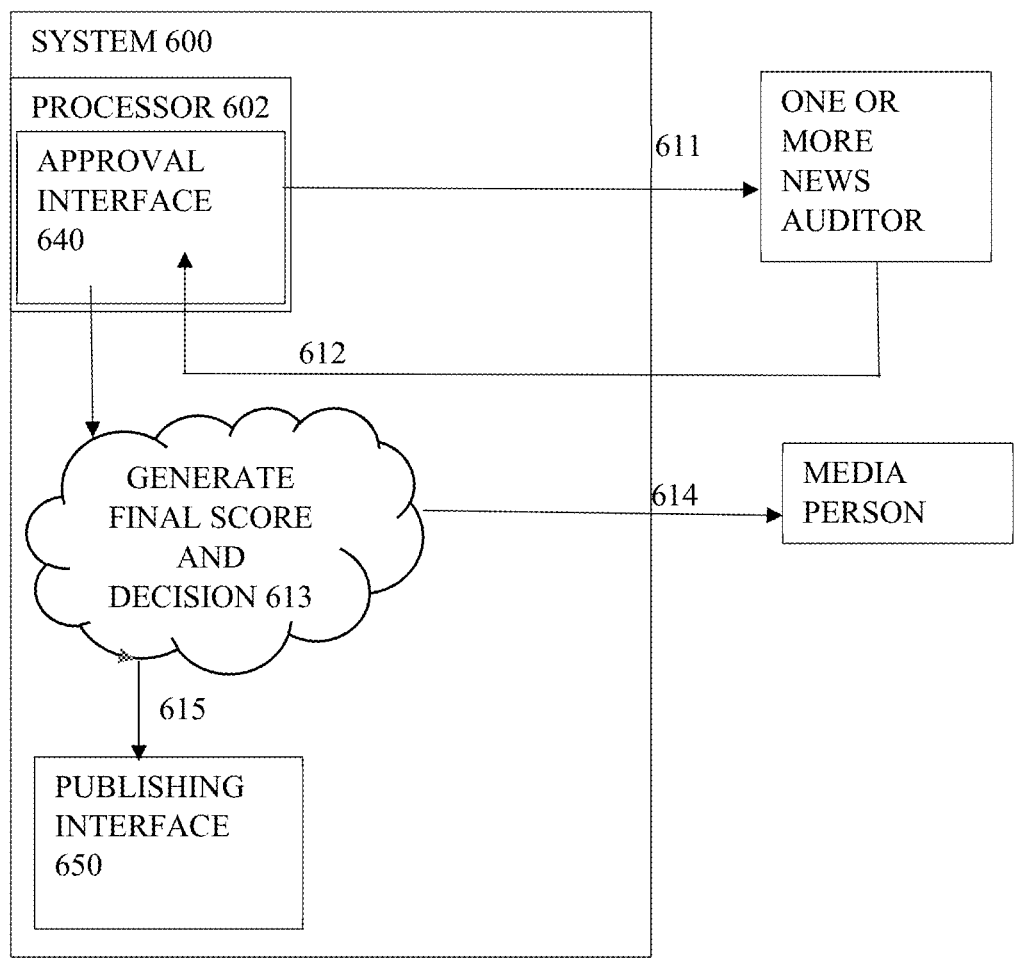
FIG. 6A-6D illustrates a schematic diagram of deciding upon the one or more content received, according to one or more embodiments.
Figure 6B:
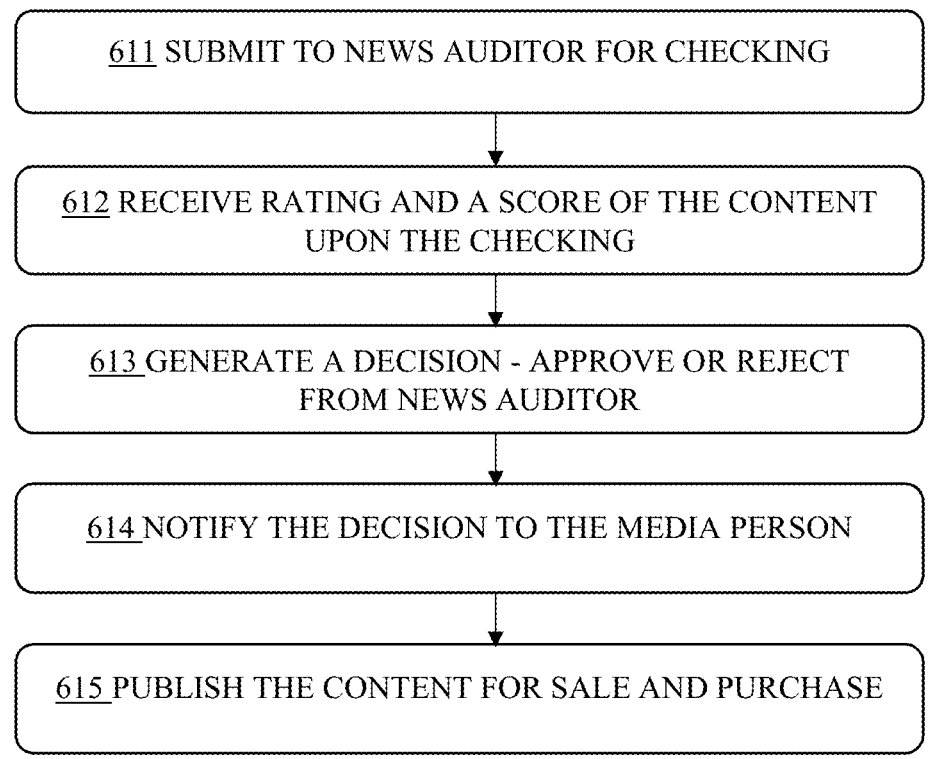
Figure 6C:
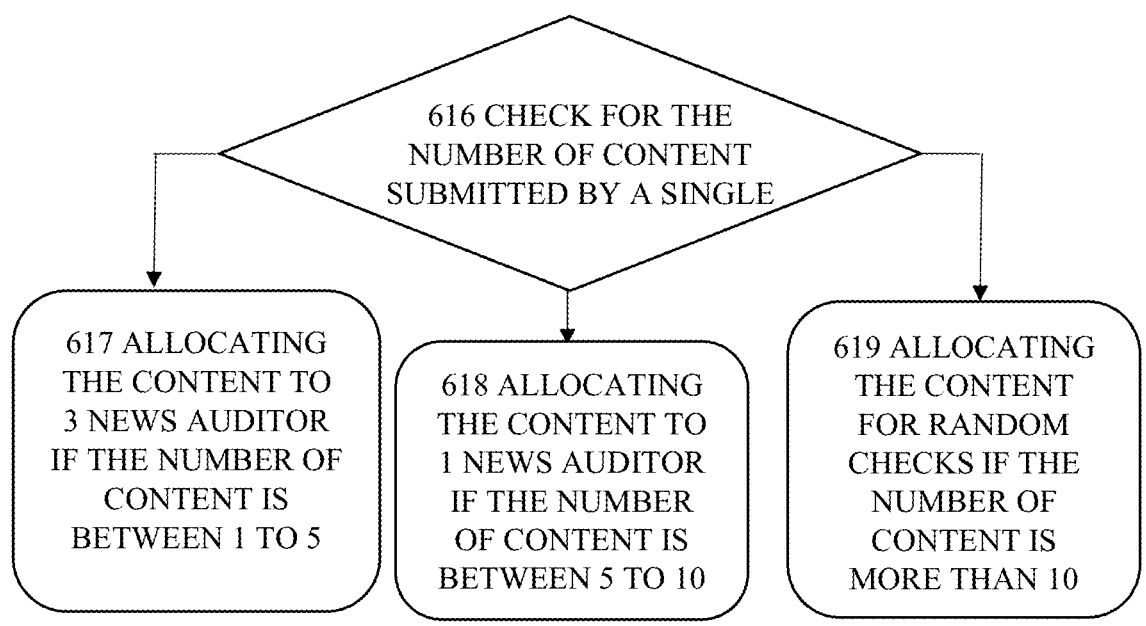

FIG. 6A-6C shows a schematic of content approval unit 640. The one or more content received is then approved by the approving unit 640. At step 611, the processor 602 is configured to allocate the one or more content to one or more news auditors. The news auditor is a subject matter expert in the area of interest such as current affairs, politics, sports, regional news, weather forecast, photo and video articles, entertainment, technology, business, economics and alike. The news auditor may have a minimum experience in the area of interest. For example, the one or more news auditors may have an experience of 10 years in the area of interest. The system administrator may invite the one or more news auditors to register on the system 600. The one or more news auditors is chosen according to the matching area of interest of the media person and the area of interest of the one or more news auditors.

The one or more content is submitted to the one or more news auditors for authentication of the one or more content. The one or more content is authenticated through geo-tagged location and is checked by the news auditor for plagiarized content, fake content, doctored content, obscene content, copied content, hate content, and alike. The one or more content is further checked for language consistency, language flow, grammar, texture, contextuality, originality, accuracy, headline and content matching, content addon elements matching, inflammatory quotient, attribution, and credits to sources for quality of the one or more content.

The language consistency is checked to figure out whether the one or more content conveys clearly what it sets out to do in the language it is written. The texture here means the overall look and feel of a video, illustration, or photograph. The contextuality is checked for whether the content has an immediate context, that is whether the one or more content is conveying the proper meaning of the topic or not. The one or more content is checked for originality for determining if the content is original or not and whether the content with a similar idea or topic is published earlier or not.

For example one or more content is allotted to the news auditor for approval. The one or more content is checked for grammar. The content is checked to see whether it is structured properly, whether the flow of the content is correct or not. If the headline of the one or more content matches and is consistent with the text of the content. If the content has quoted text, or images from other sources, then if it mentions the sources or not. The one or more content is checked to see whether it has obscene, vulgar, propagandist or inflammatory content. The links in the content are checked for contextuality. The links are checked by clicking on it to see if the links work or not. If images are taken from other sources like the internet or a photographer, they are given the credits or not. The images are checked for the consistency in the caption, whether the caption is consistent and proper with the context of the image. The videos are checked for the quality of the video, clarity, and the originality of the video captured.

The one or more news auditors score the one or more content upon the checking. At step 612, the processor 602 is configured to receive a score from the one or more news auditors. At step 613, the processor 602 generates a decision of the one or more content that is the one or more content is approved or rejected based upon the score received from the one or more news auditors. At step 614, the media person is notified of the decision that the one or more content is approved or rejected. At step 615, the one or more content is published by the publishing unit 650. Only the one or more content that is approved is published.

In an embodiment shown in FIG. 6C, the one or more content allocated to the one or more news auditors depends on a count of one or more contents published by the media person. The count of content published is the number of the one or more contents approved by the content approval unit and then published. For example, at step 616, the system checks for the count of content published by the media person. At step 617, if the count of the one or more contents is between one to five, the one or more content is allocated to three news auditors. At Step 618, if the count is between six to ten then it is allocated to one news auditor. At step 619, if the count is more than ten then the content approval unit is configured to conduct random checks for the approval of the one or more content.

In another embodiment, the one or more content is authenticated through the one or more news auditors or by an artificial intelligence technique. The artificial technique comprises: a statistical analysis, a machine learning algorithm, or a rule-based analysis. The artificial intelligence technique may check for plagiarized content, fake content, doctored content, obscene content, copied content, hate content, and alike. The one or more content is further checked for language consistency, language flow, and grammar for the quality of the one or more content. The processor 602 generates a decision of the one or more content that is the one or more content is approved or rejected. The media person is notified of the decision that the one or more content is approved or rejected.

Figure 6D:
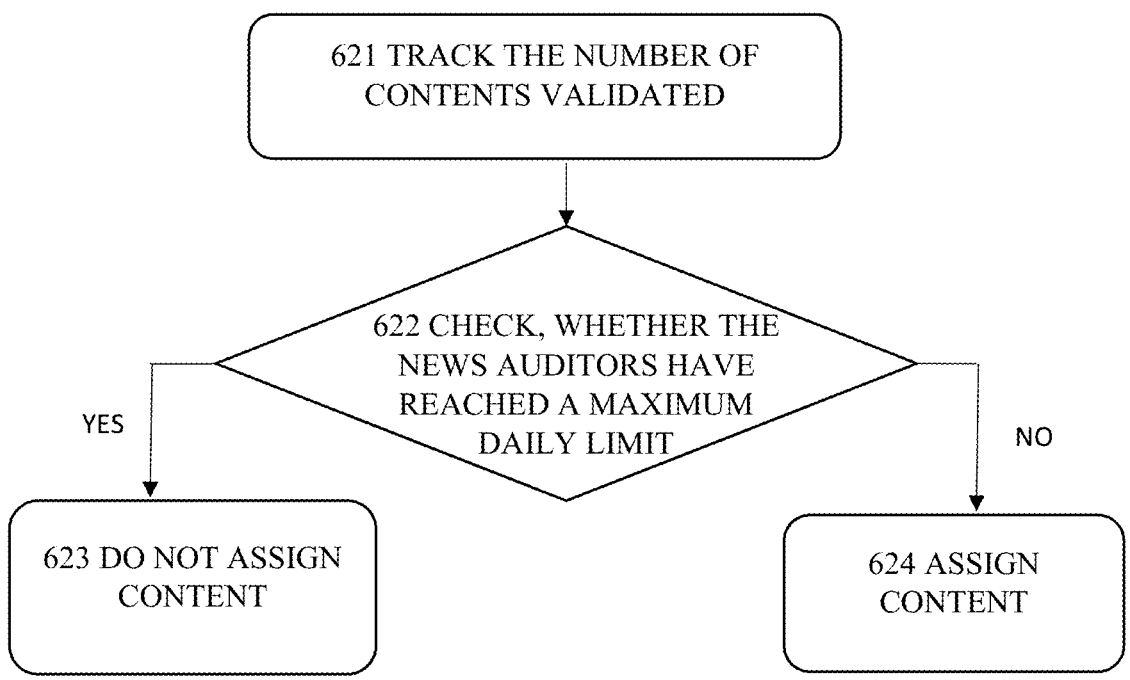

FIG. 6D illustrates the flow chart of tracking the count of one or more content that is allocated to one or more news auditors. In an embodiment, the quality of authentication and quantity of the one or more content authenticated is tracked by the processor 602. At step 621, the processor 602 is configured to track a count of content approved by the one or more news auditors. The one or more news auditors have a maximum daily limit for authenticating the one or more content. At step 622, the processor checks if the news auditor has reached the maximum daily limit by checking the count of content of the news auditor. At step 623, the news auditors are not allowed to authenticate the one or more content after reaching the predefined daily limit. The processor 602 is configured to not assign more content upon reaching the predefined daily limit. At step 624, if the news auditor has not reached the predefined daily limit, the processor 602 is configured to assign more content.

In an embodiment, a first rating of the content is received by the system 600 from the news auditor. For example, a news auditor may give a first rating to the approved content on a scale of one to five.

In an embodiment, the system administrator manages the one or more news auditors in the system. The system keeps a track on the availability of the one or more news auditors daily, for allocating the one or more content. The system may receive requests for availing leaves by the news auditor. The news auditor also may be able to view the contents allocated and also the leaves applied on a dashboard.

The one or more content that is approved by the news auditor is published by the publishing unit 650. The one or more content once published is then available for sale and auction. The one or more content is published with a pricing. The pricing is decided according to a count of the target audience of the media outlet and the pricing changes dynamically for different media outlets. For example, a newspaper outlet has a target audience of 10,000 readers and an online news service has a target audience of 1 million viewers. The pricing for the online news service may be more than that of the newspaper outlet. The one or more content is published with a watermark on the background. The watermark is of the system 600. The watermark on the one or more content restricts a media outlet from unauthorised usage of the one or more content. The one or more content published also contains the first rating provided by the news auditor.

In an embodiment, the one or more content may be published in multiple languages. A request to translate or transcribe the one or more content may be received while receiving the one or more content. The media person may choose to transcribe or translate the one or more content to publish it in one or more languages. The media person may also choose one or more languages to translate or transcribe the one or more content.

In an embodiment, the processor 602 is configured to generate a recommendation of a target audience for news based upon the one or more content and a location to the media person for the sale or auction of the one or more content. The one or more content is sold as offered, shared or exclusive. The one or more content may be offered as free, shared between two or more media outlets or exclusively to a media outlet.

Figure 7A:
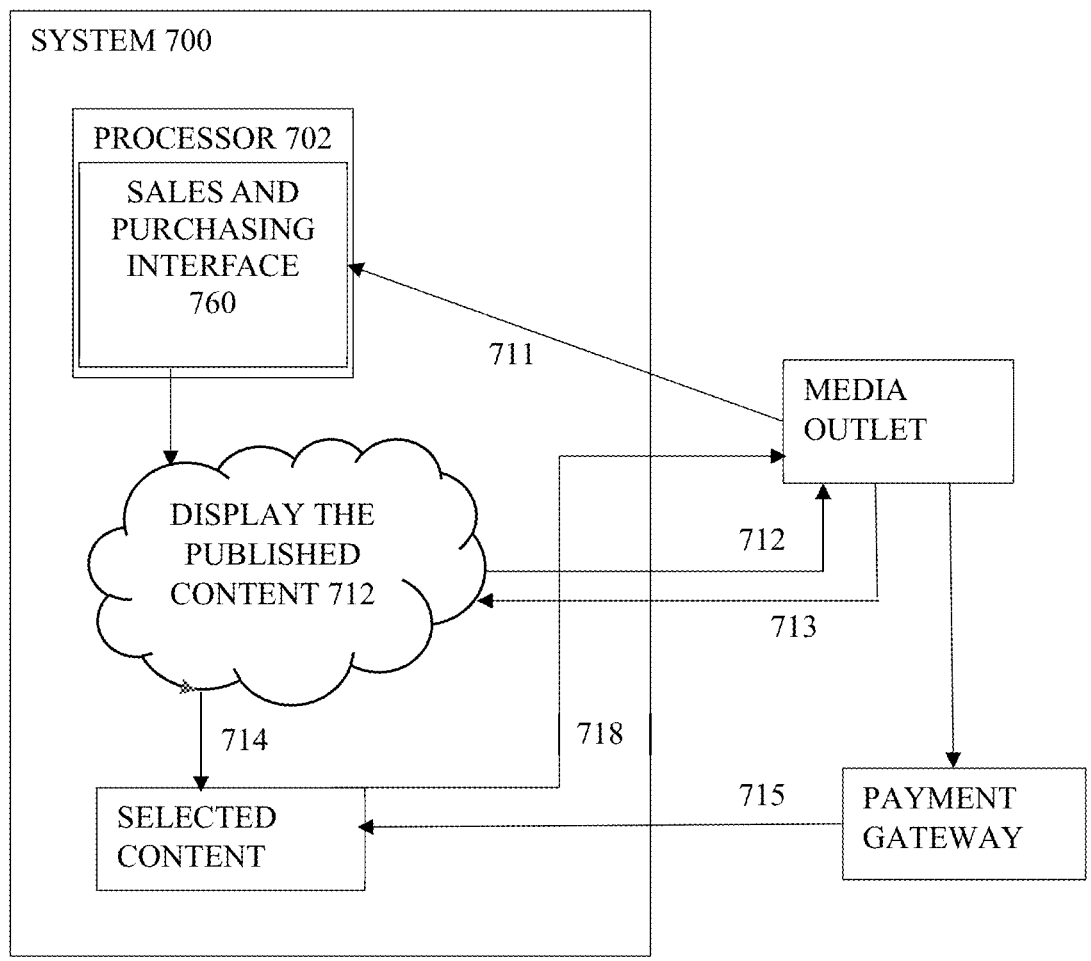
FIG. 7A-7B illustrates a schematic diagram of the purchase of one or more content through the content sales, purchase, and auction unit, according to one or more embodiments.
Figure 7B:
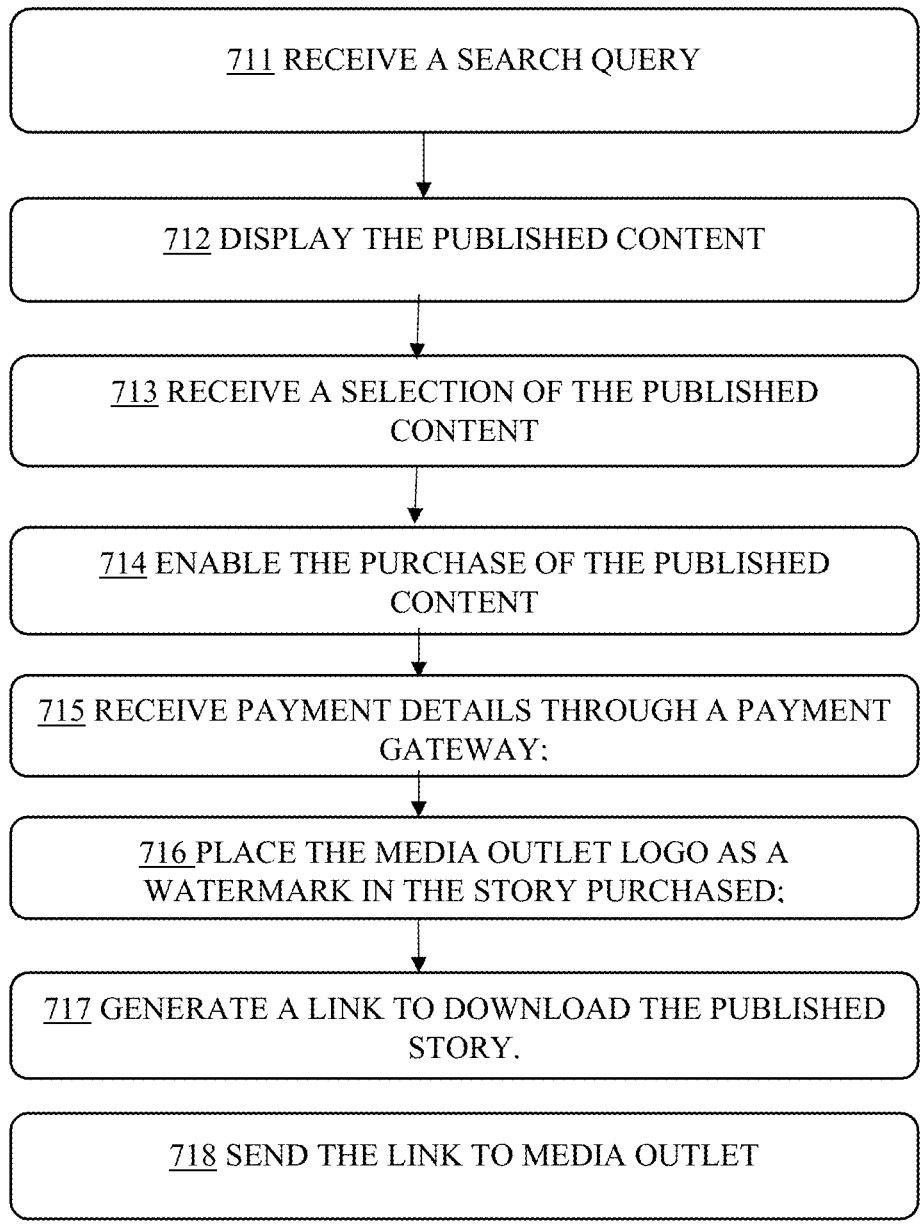
Figure 8A:
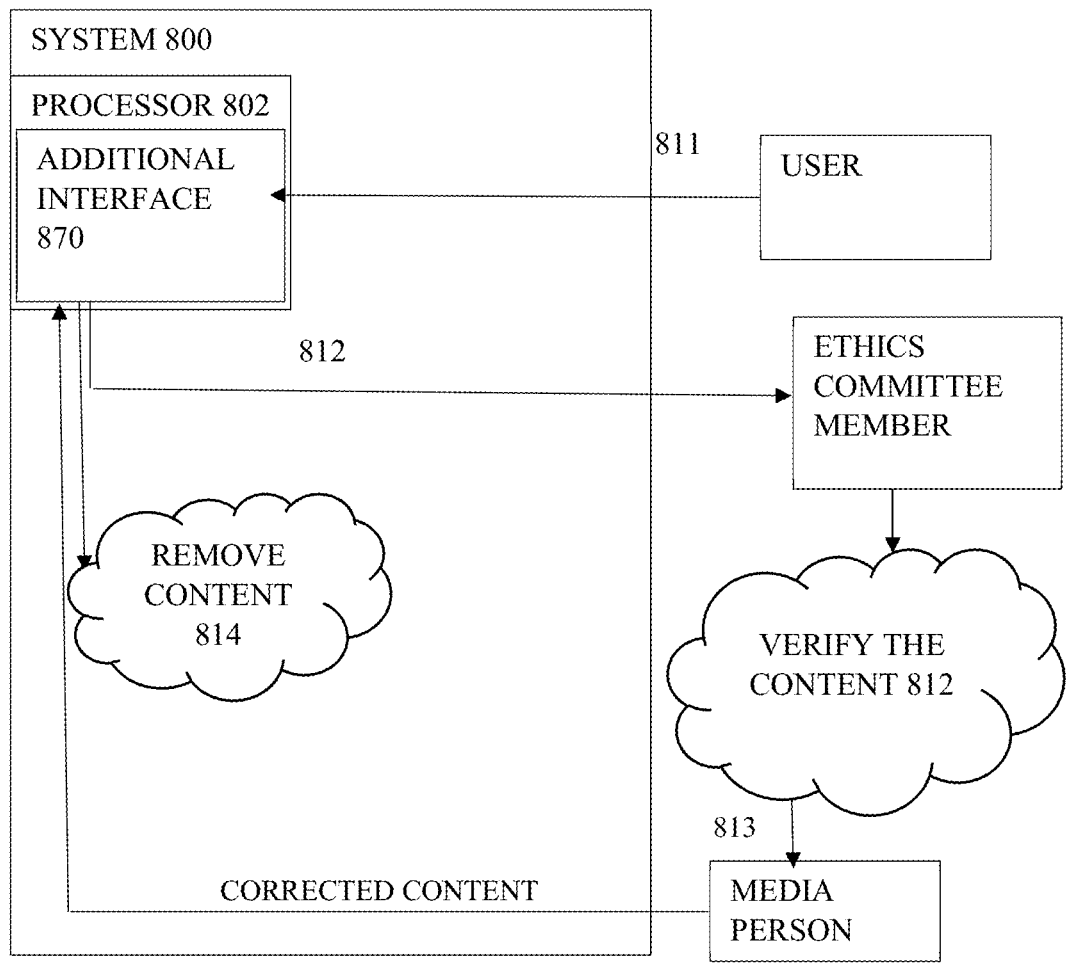
FIG. 8A-8B illustrates a schematic diagram for checking if one or more content is unethical by the ethics committee members, according to one or more embodiments.
Figure 8B:
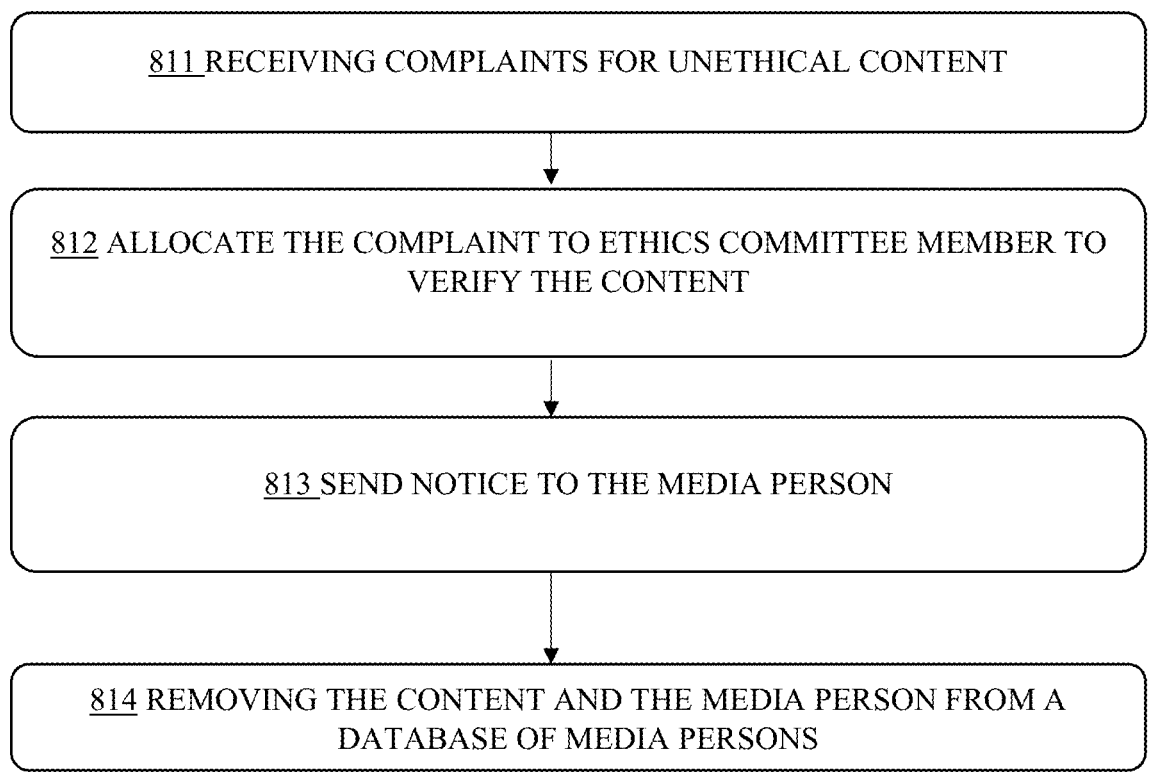

FIG. 7 shows the purchase of one or more content. In an embodiment, if the registration is received as a media outlet, the registration is confirmed by the system administrator. At step 711, the system 700 may receive a search query for the published content from the media outlet. The search query may contain the area of interest, location of the one or more content, the one or more content is offered free, sold non-exclusively to two or more media outlets or sold exclusively to a media outlet. At step 712, the processor 702 may display a list of published content according to the search query received. At step 713, the processor 702 may receive a selection of the one or more content from the list displayed. At step 714, the processor 702 may enable the purchase of the one or more content selected. At step 715, the processor 702 may receive payment details through a payment gateway. The payment gateway may be a third-party payment method or an inbuilt payment method. At step 716, the processor 702 is configured to place a media outlet logo as a watermark in the one or more content purchased. At step 717, the processor 702 generates a link to download the purchased content and at step 718, the processor 702 sends the link to the media outlet for downloading.

In an embodiment, in case the media outlet is an online news service, the media outlet purchases the content via artificial intelligence techniques. The online news service searches through a list of published content via an artificial intelligence engine. The online news service may comprise Google news, Facebook and alike. The online news service may collaborate with other business platforms such as Ola, Uber, airlines, and trains. The online news service may select the list of published content through artificial intelligence techniques. Purchase of the selected list of published content is done by receiving an automatic payment from an account linked with the online news service through a payment gateway.

For example, if a person travelling from New York to California requests to see weather updates of California in an airline, say XYZ Airlines. The XYZ Airlines has access to the virtual newsroom system through collaboration of the virtual newsroom system and the Airline business. The artificial intelligence techniques may search for one or more contents for news on weather updates of California, select a relevant one or more content and purchase the one or more content for publishing. The relevant one or more content contains the updates on weather in California. The relevant one or more content is then displayed on the user device.

In an embodiment, the processor 702 is configured to receive a first rating of the published content and a second rating of the media person from the media outlet. For example, the media outlet may rate the one or more content and the media person on a scale of one to five based on the quality of the one or more content received from the media person.

In an embodiment, the processor 702 is configured to generate recommendations through the AI engine for the media outlet according to the search query received. The recommendations generated are of the one or more content based upon the location, area of interest and the keywords received from the media outlet. The recommendations are then displayed to the media outlet for purchasing the one or more content. The recommendations generated are matched through artificial intelligence and machine learning techniques. The artificial intelligence and the machine learning techniques learn through the history of search queries, the matching area of interests of the media person and the media outlet, the keywords of location of the one or more content in a database. The artificial intelligence may generate recommendations based on the machine learning and help the media outlet to receive a relevant list of one or more contents to purchase based upon the target audience, the location and area of interest.

In an embodiment, the processor 702 is configured to receive an additional requirement from the media outlet. The additional requirement may be a job requirement, resources required, content required on a particular subject, exclusive content requirement and alike. The additional requirements that are received are then displayed to the media person. The processor 702 may receive one or more entries for the additional requirement displayed.

For example, a media outlet requires a full-time media person to write a sports column in the newspaper New York Times. The additional requirement for a media person is received by the processor. This requirement is displayed to the media person by the virtual newsroom system 700. The entries for the additional requirement of a sports columnist are received from one or more media persons by the processor 702.

In an embodiment, at step 811, the processor 802 is configured to receive complaints for one or more content that is unethical. The unethical content comprises: obscene, criminal, violent, offensive, fake and hate content. At step 812, the processor 802 allocates the complaint that is received to an ethics committee member. The ethics committee member is a subject matter expert in the area of interest such as current affairs, politics, sports, regional news, weather forecast, photo and video articles, entertainment, technology, business, economics and alike. The ethics committee member may have experience in the area of interest for a predefined number of years. The system administrator may invite a subject matter expert to register as the ethics committee member. For example, a subject matter expert of 40 years of experience is invited by the system administrator to register as an ethics committee member. The ethics committee member may check the one or more content that is said to be unethical. The processor 802 may receive feedback from the ethics committee member—the content is ethical or unethical. At step 813, the processor 802 is configured to send a notice to the media person if the one or more content is found to be unethical. The processor 802 may receive a corrected one or more content from the media person. The processor 802 may remove the one or more content and the media person from a database, if the one or more content is not corrected within a pe-defined time. At step 814, the processor 802 is operable to: conduct periodic checks for unethical and plagiarism issues.

Figure 9:
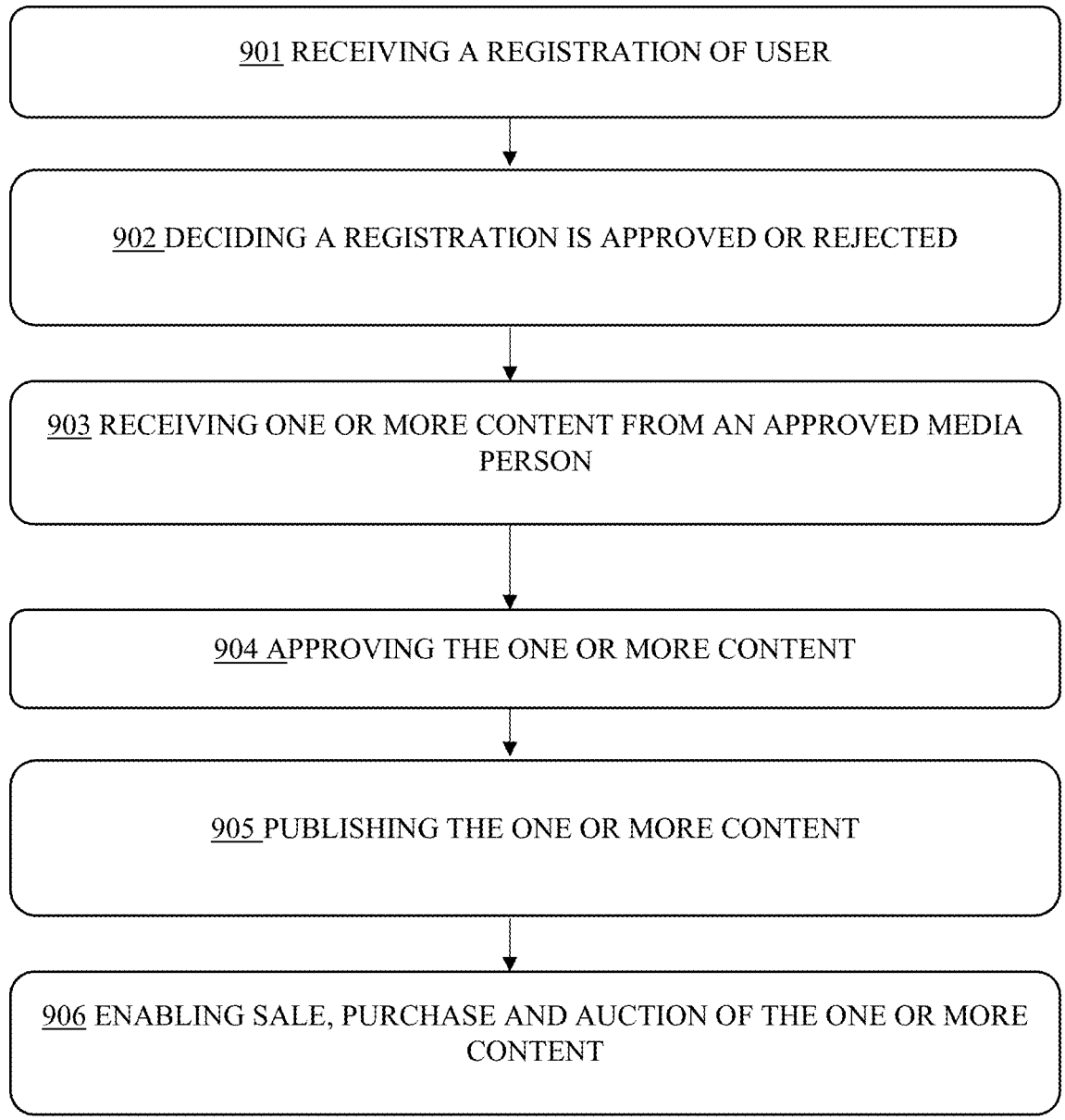
FIG. 9 illustrates a method for executing the virtual newsroom system, according to one or more embodiments.

FIG. 9 illustrates a method for executing the virtual newsroom system, according to one or more embodiments. At step 901, registration of a user is received. The user is an individual interacting with the system 300. The user for the virtual newsroom system may be a media person, a media outlet, an editorial board member, a news auditor, and an ethics committee member. The system administrator may invite the user for registration. The registration also may be received through a signup in the system 300.

In case the registration received is of a media person, the registration comprises a language preference for the system. Upon receiving the language preference, a name, an email id, password, a biodata, a sample of content, a resume, one or more references of known media persons, one or more social media links, an area of interest, target audience, a language of content, a location of the media person is received. The sample of content may be a text article, an audio, an image, a video, or a combination, wherein the image comprises: photographs, sketches, charts, and others. The language of content may comprise the language of content comprises: English, Portuguese, Polish, Spanish, French, Russian, German, Turkish, Italian, Ukrainian, Greek, Arabic, Swahili, Yoruba, Chinese, Hindi, Indonesian, Bangla, Japanese, Punjabi, Filipino, Korean, Vietnamese, Telugu, Tamil, Urdu, Nepali, Gujarati, Malayalam, Marathi, Hebrew, Thai, Persian, Kannada, Malay, Uzbek, and others.

The social media links may be social media account LINK's or handles comprising sites: Twitter, LinkedIn, Facebook, Instagram, and others.

In case the registration received is of a media person, a language preference is received by the system. After the language preference, media outlet name, email id, password, logo, website link, one or more social media links, one or more preferred content languages; a target audience, an area of interest, and a location where the content is to be published. Upon receiving the registration as the media outlet, payment details are received. The registration is confirmed after receiving the payment details. The media outlet may be any media comprising: a newspaper, a periodical, a television, a radio, a newsletter, an online news service and others. The area of interest is used to match with the area of interest of the user as a media outlet and the location for publishing the one or more content is selected based on a majority of the target audience.

After receiving the registration, payment details are received through a payment gateway. The payment gateway used here may be a third-party payment gateway, or a payment gateway developed for the system 200. On receiving the payment details, the registration is confirmed by the system 200.

At step 902, the processor 202 through the registration approval unit 220, is configured to decide whether the registration is to be approved or rejected. The registration of the media outlet is approved or rejected through a system administrator. The registration of the editorial board member, the news auditor, and the ethics committee member may not require approval as they are invited by the system administrator. The processor 202 is configured to analyze the registration received and choose one or more editorial board members or by an artificial intelligence technique. The registration is analyzed, and the one or more editorial board members are chosen by matching the area of interest, the target audience, the language of content, and the location of the media person. Upon the analysis of the registration and choosing the one or more editorial board members, the sample of content, references and social media links are sent to chosen editorial board members. The one or more chosen editorial board members check the sample of content and analyze the sample of content, cross check the references, and contact the reference for authenticating the references provided. The social media links are cross checked by the one or more chosen editorial board members. The one or more chosen editorial board members then score the media person based on the analysis.

The system 200 by the processor 202 receives a score from each of the chosen editorial board members. The processor 202 generates a final score based on the score received. Based upon the final score generated, the processor 202 generates a decision for the media person. The decision comprises: an approval or a rejection. The media person is notified of the decision via a message or an email. The date and time logs of the registration and the decision of the registration are maintained. In an embodiment, according to the date and time logs, the media person with the decision as rejected is barred from a pre-defined period of time. For example, the predefined period of time may be from 6 months to one year.

At step 903, The processor is configured to receive the one or more content from an approved media person. The one or more content received by the content receiving unit 230 comprises: text articles, audios, images, videos or a combination and the images comprise: photographs, sketches, charts, and others. The text articles may comprise writeups on the area of interest of the media person. There may be a predefined number of images, audio and videos allowed. A time length may be fixed for the audio and videos received. The one or more content received is geo-tagged with a location from which the content originated.

At step 904, the one or more content is authenticated by an approving unit 440. The content is approved or rejected by the one or more news auditors or by artificial intelligence techniques. The processor is configured to allocate the one or more content to one or more news auditors. The system administrator may invite the one or more news auditors to register on the system 400. The one or more news auditors is chosen according to the matching area of interest of the media person and the area of interest of the one or more news auditors. The one or more content is authenticated through geo-tagged location and is checked by the news auditor for plagiarized content, fake content, doctored content, obscene content, copied content, hate content, and alike. The one or more content is further checked for language consistency, language flow, and grammar for the quality of the one or more content. a decision of the one or more content that is the one or more content is approved or rejected. The media person is notified of the decision that the one or more content is approved or rejected.

At step 905, the one or more content is published by the publishing unit 350. The one or more content published is available for sale and auction. The media outlet may purchase the one or more content. The one or more content is published with a pricing. The pricing is decided according to a count of the target audience of the media outlet and the pricing changes dynamically for different media outlets. The one or more content is published with a watermark on the background. The watermark is of the system 300. The watermark on the one or more content restricts a media outlet from unauthorised usage of the one or more content. The one or more content published also contains the first rating and second rating provided by the news auditor.

At step 906, the one or more content once published is then enabled for sale, purchase, and auction. The system 200 may receive a search query for the published content from the media outlet. The search query may contain the area of interest, location of the one or more content, the one or more content as is offered free, sold non-exclusively to two or more media outlets or sold exclusively to a media outlet. The processor 202 may display a list of published content according to the search query received. Then the processor 202 may receive a selection of the one or more content from the list displayed. The processor 202 may enable the purchase of the one or more content selected. The processor 202 may receive payment details through a payment gateway. The payment gateway may be a third-party payment method or an inbuilt payment method. The processor 202 is configured to place a media outlet logo as a watermark in the one or more content purchased. The processor 202 generates a link to download the purchased content and sends the link to the media outlet for downloading.

Figure 10A:
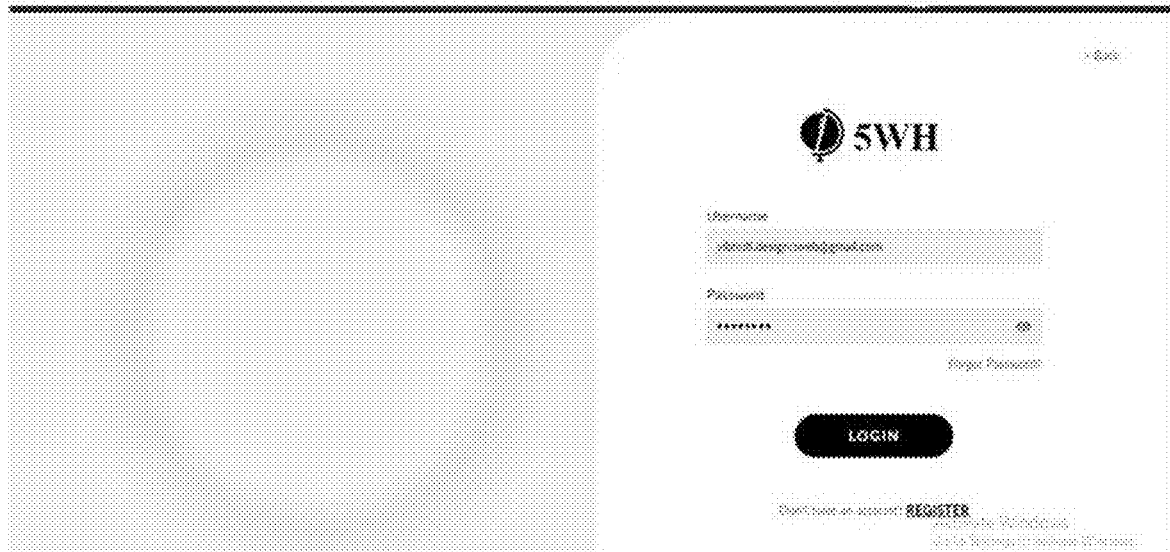
FIG. 10A to 10P illustrate examples of a user unit of a virtual newsroom system 200.
Figure 10B:
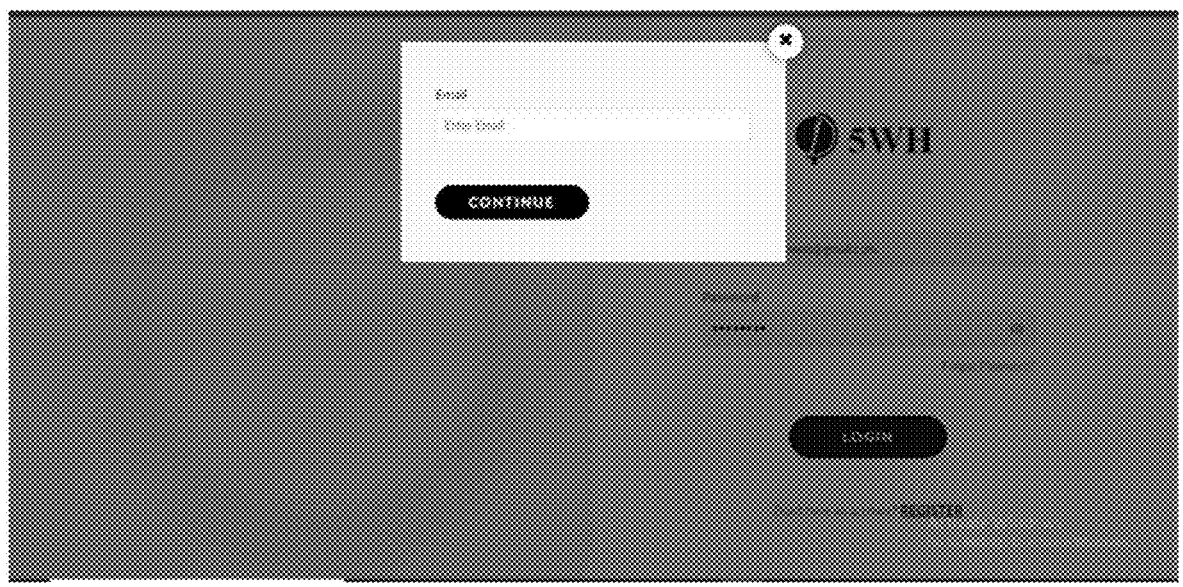
Figure 10C:
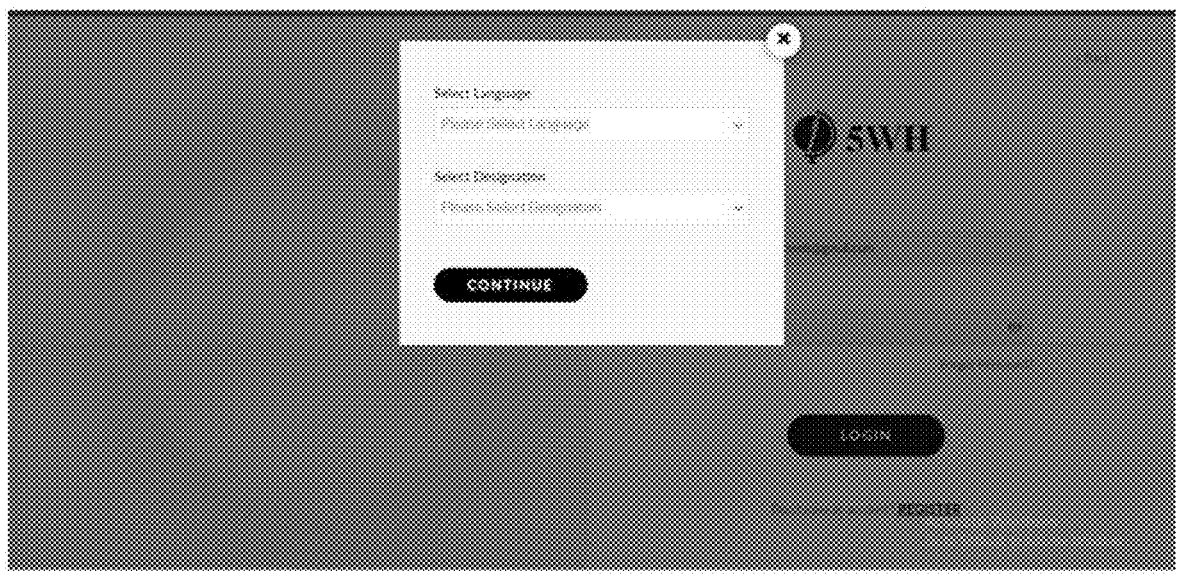
Figure 10D:
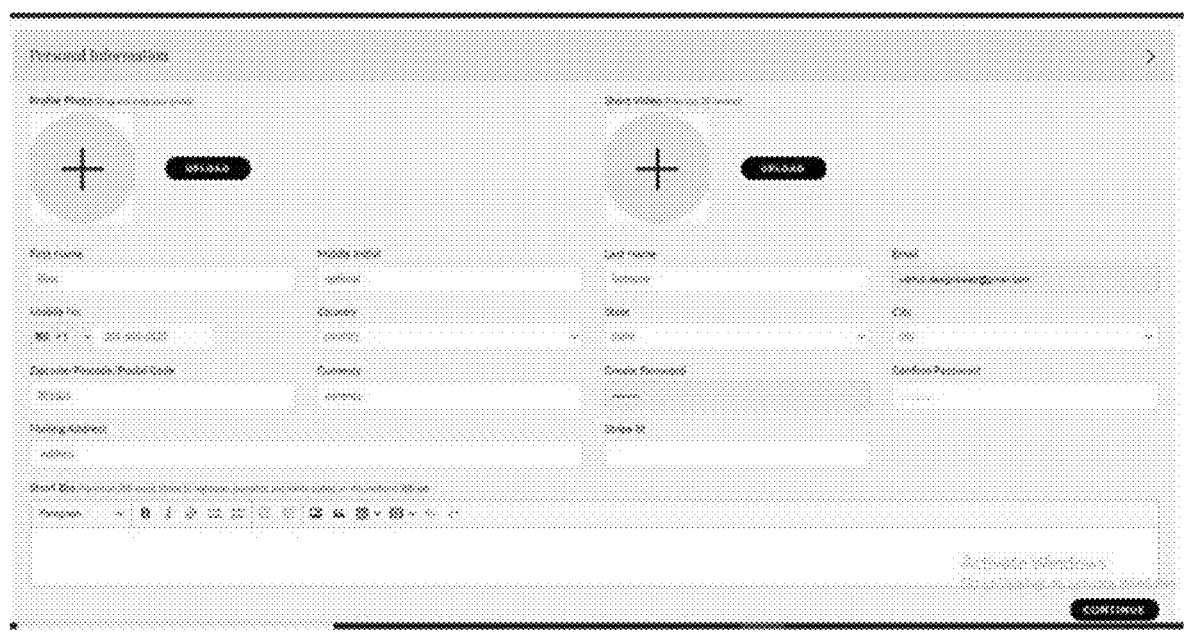
Figure 10E:
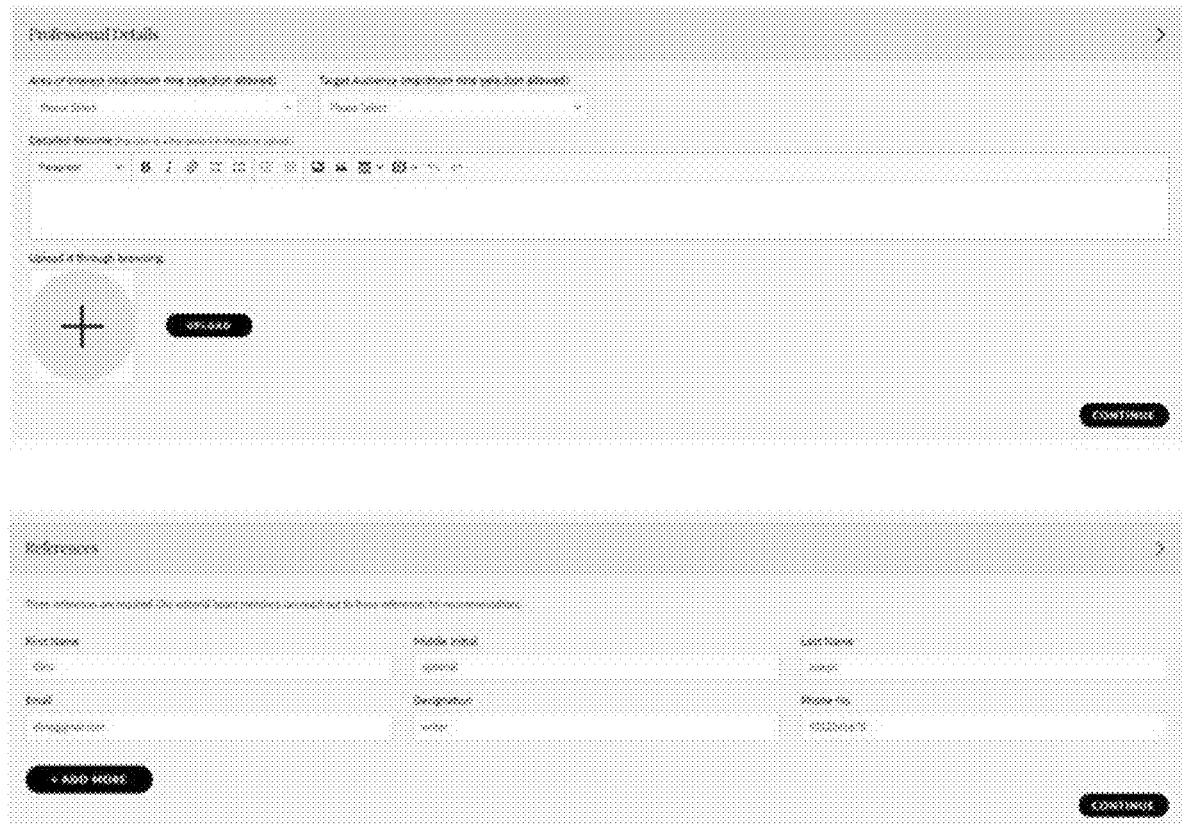
Figure 10F:
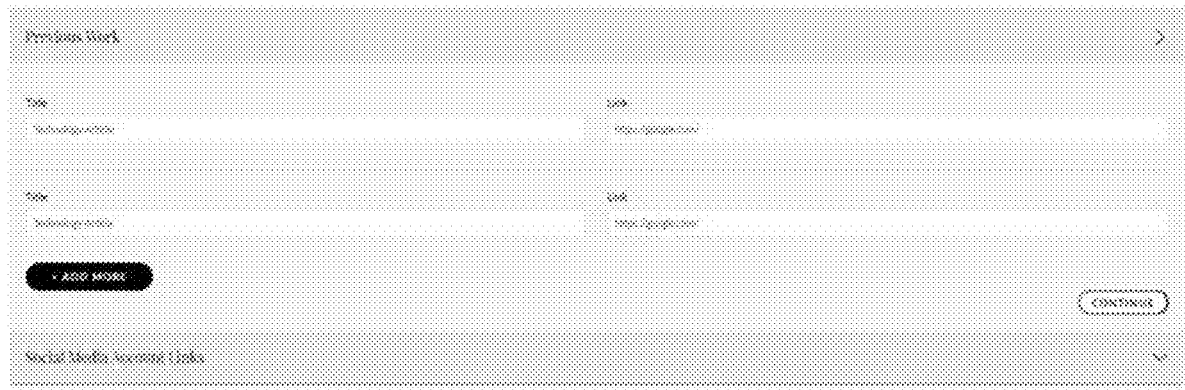
Figure 10G:
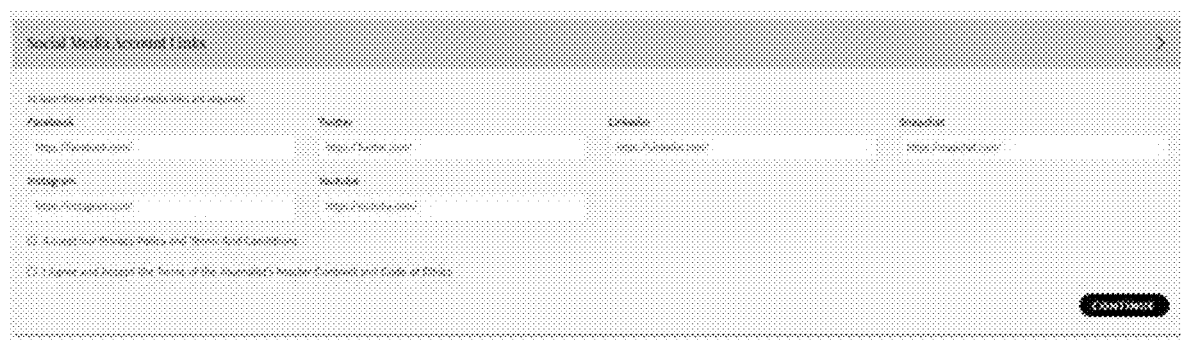
Figure 10H:
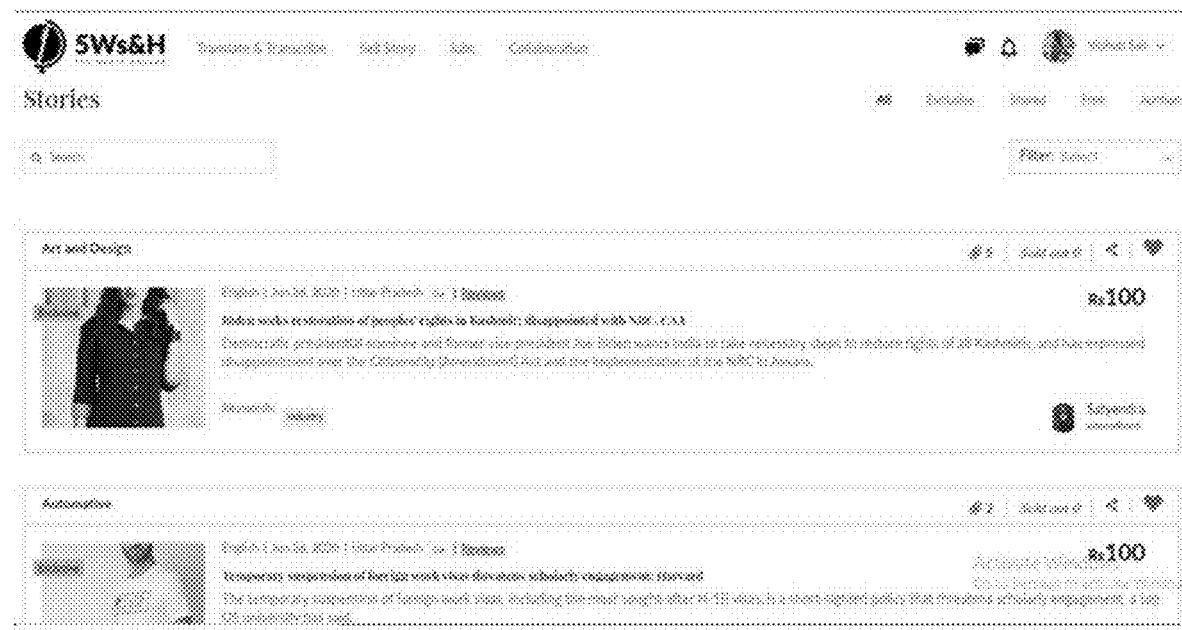
Figure 10I:
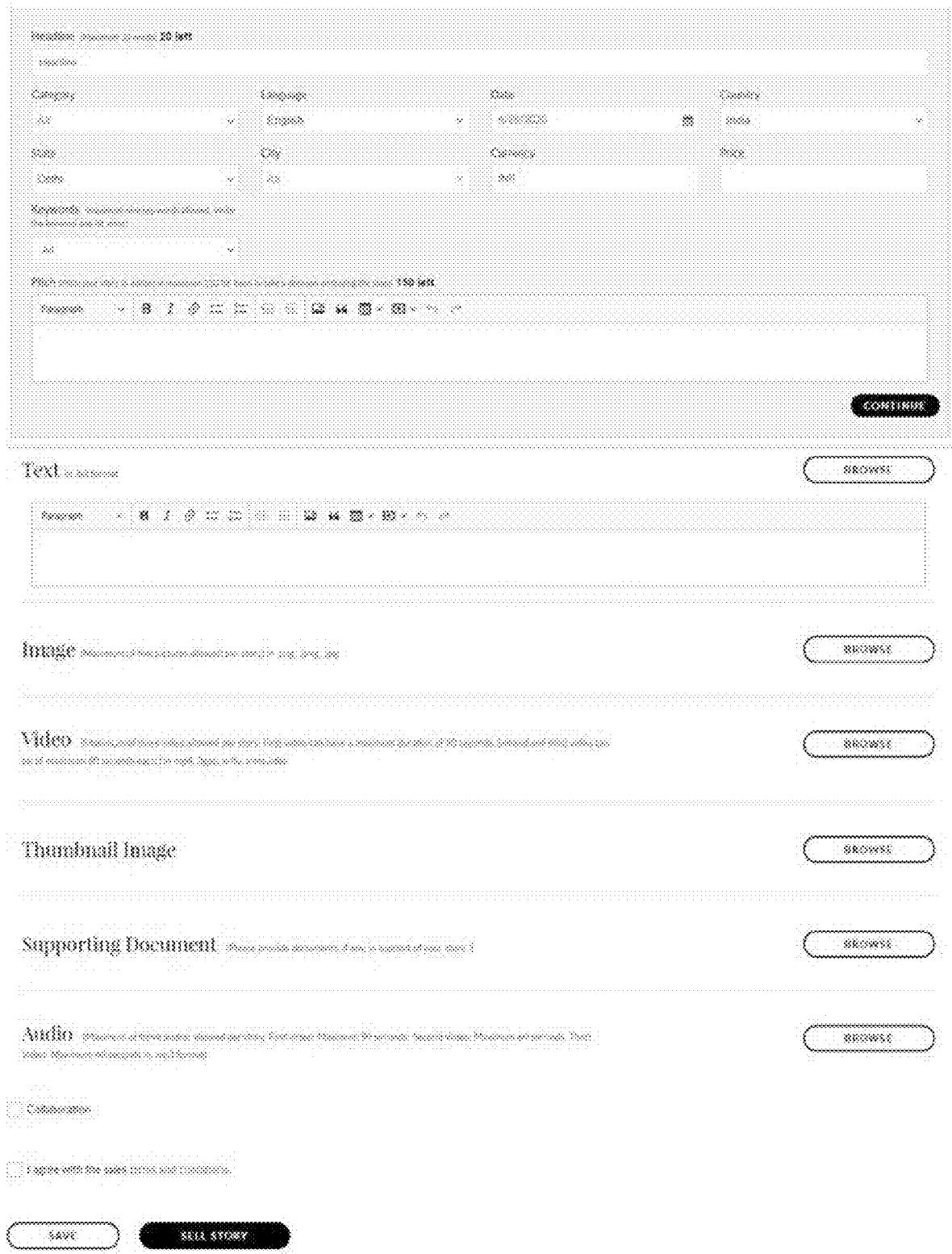
Figure 10J:
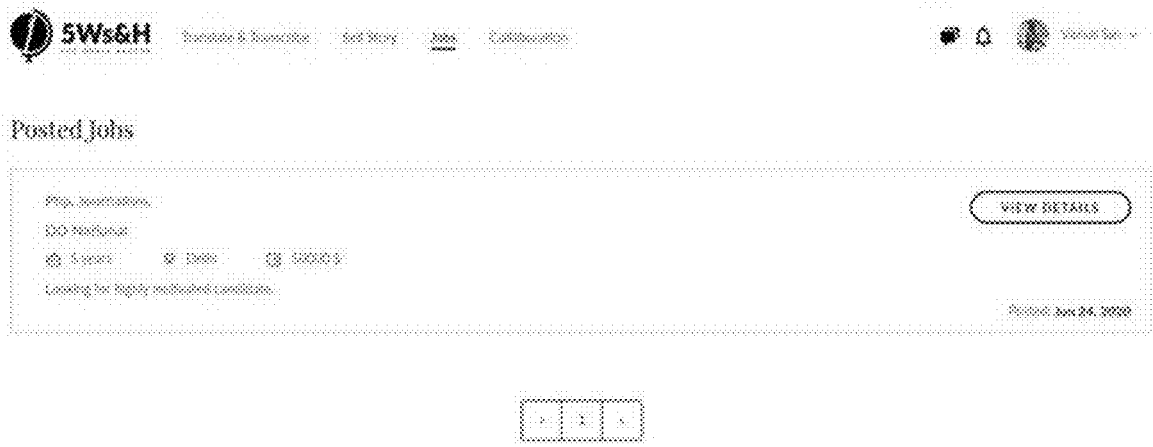
Figure 10K:
Figure 10L:
Figures 10M, 10N:
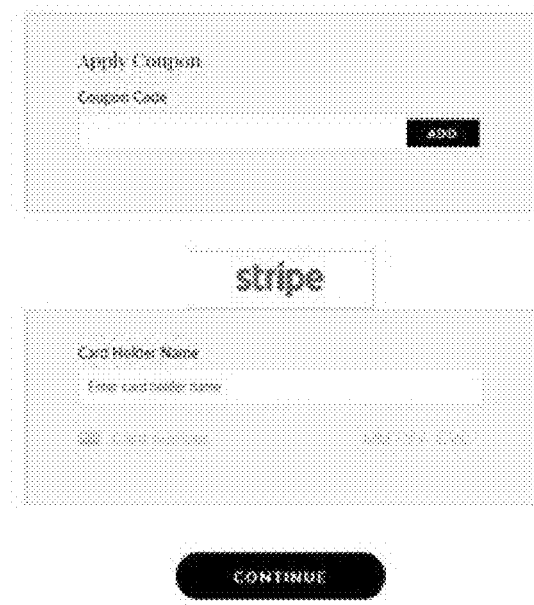
Figure 10O:
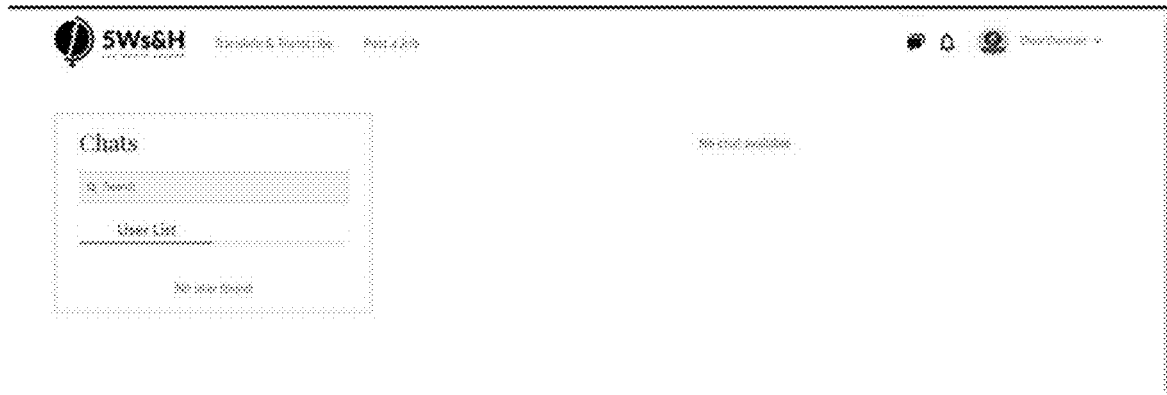
Figure 10P:

FIG. 10A to 10N illustrate examples of a user unit of a virtual newsroom system 200. FIG. 10A illustrates the login page. FIG. 10B shows the forgot password page. FIG. 10C shows a selection of a user and language selection page. FIG. 10D to 10F shows a registration page of the media person or a media outlet. FIG. 10G shows a membership fee payment page. FIG. 10H shows the page when a media person or a media outlet logs in. It shows the one or more content uploaded by the media persons. FIG. 10I shows the form for receiving the one or more content from the media person. FIG. 10J shows the additional requirements such as a job posted. FIG. 10K dashboard showing the collaboration of media persons. FIG. 10L shows the ethics committee complaint page. FIG. 10M shows the media outlet purchase page. FIG. 10N shows the additional requirement form for the media outlet. FIG. 10O shows the chat page for the user. FIG. 10P shows the Frequently Asked Questions (FAQ) page for the user.

The foregoing disclosure provides illustration and description but is not intended to be exhaustive or to limit the implementations to the precise form disclosed. Modifications and variations are possible in light of the above disclosure or may be acquired from practice of the implementations.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, etc. The invention may also be practiced in distributed system environments where local and remote computer systems, which are linked (either by hardwired data links, wireless data links, or by a combination of hardwired and wireless data links) through a network, both perform tasks. In a distributed system environment, program modules, units may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Although the present embodiments have been described with reference to specific example embodiments, it will be evident that various modifications and changes may be made to these embodiments without departing from the broader spirit and scope of the various embodiments. For example, the various devices, units, and modules described herein may be enabled and operated using hardware circuitry (e.g., Complementary Metal Oxide Semiconductor (CMOS) based logic circuitry), firmware, software or any combination of hardware, firmware, and software (e.g., embodied in a non-transitory machine-readable medium). For example, the various electrical structures and methods may be embodied using transistors, logic gates, and electrical circuits (e.g., Application Specific Integrated Circuit (ASIC) and/or Digital Signal Processor (DSP) circuit).

In addition, it will be appreciated that the various operations, processes, and methods disclosed herein may be embodied in a non-transitory machine-readable medium and/or a system. Accordingly, the specification and drawings are to be regarded in an illustrative rather than a restrictive sense.

INCORPORATION BY REFERENCE

All publications, patents, and patent applications cited in this Specification are hereby incorporated by reference in their entirety, including: US20110054959A1 published as "System and method for a standards-based journalism marketplace"

What is claimed is:

1. A method comprising:
receiving, through a user registration unit of a virtual newsroom system, a registration of a media person, wherein the registration of the media person comprises submitting a first content;
deciding through a registration approving unit of the virtual newsroom system, the registration of the media person for one of an approval and a rejection based on a first score dynamically generated by analyzing the first content;
receiving through a content receiving unit of the virtual newsroom system, a second content from an approved media person;
approving, through an approving unit of the virtual newsroom system, the second content, wherein the approval of the second content is based on a second score dynamically generated, wherein a first rating of the second content and a second rating of the approved media person is dynamically updated every time the second score is generated;
publishing, on a publishing unit of the virtual newsroom system, the second content; and
enabling, through a sale and purchase unit of the virtual newsroom system, at least one of a sale, a purchase, and an auction of the second content,
receiving a search query from a media outlet; wherein the search query comprises keywords for a first location, an area of interest, a language, and a topic;
displaying a list of the second content according to the search query received;
wherein a recommendation of the second content for the purchase, to a media outlet is generated, using artificial intelligence and machine learning techniques, based on a history of search query, a matching area of interest of the media person and the media outlet, the first location of the second content to be published by the media outlet and a target audience; and
wherein a pricing of the second content is dynamically changed for the media outlet according to a count of the target audience of the media outlet.

2. The method of claim 1, wherein the user registration unit of the virtual newsroom system is further enabled to register at least one of the media outlet, an editorial board member, a news auditor, and an ethics committee member.

3. The method of claim 2, wherein the registration for the media outlet comprises:
receiving at least one of a name of the media outlet, an email id, a password, a logo, a website link, a social media link, a preferred content language, the target audience of the media outlet, an area of interest, and the first location where the content is to be published;
receiving payment details for membership through a payment gateway; and
confirming the registration; and
wherein the media outlet comprises at least one of a newspaper, a periodical, a television, a radio, a newsletter, and an online news service.

4. The method of claim 3, wherein the area of interest is used to match with the area of interest of a media outlet and wherein a publishing location for the second content is selected based on a majority of the target audience.

5. The method of claim 1, wherein the registration of the media person, comprises:
receiving at least one of a language preference, a name, an email id, a password, a biodata, a sample of content, a resume, a reference of known media person, a social media link, an area of interest, the target audience of the media outlet, a language of content, and a second location of the media person; and
receiving payment details through a payment gateway.

6. The method of claim 5, wherein deciding the registration of the media person comprises:
analyzing and choosing an editorial board member by matching the area of interest, the target audience of the media outlet, the language of content and the second location of the media person;
sending at least one of the first content, the reference of known media person, and the social media link to chosen editorial board member;
receiving a score from the chosen editorial board member;
generating the first score based on the score received from the chosen editorial board member; and
deciding one of the approval and the rejection of the registration of the media person.

7. The method of claim 1, wherein the registration is by one of a signup, an endorsement, and an invite.

8. The method of claim 1, wherein deciding the registration is by one of an editorial board and an artificial intelligence technique.

9. The method of claim 1, wherein the first content and the second content comprise:
at least one of a text article, an audio, an image, a video, and a combination thereof, wherein the image comprises at least one of a photograph, a sketch, and a chart.

10. The method of claim 1, wherein the first content and the second content are authenticated by at least one of a news auditor and by an artificial intelligence technique comprising a statistical analysis, a machine learning algorithm, and a rule-based analysis.

11. The method of claim 10, wherein the first content and the second content are authenticated through a geo-tagged location and is further checked for at least one of a plagiarism, a fakery, a doctoring, an obscenity, a copy, and a hate invoking material.

12. The method of claim 10, the first content and the second content is checked for at least one of a language consistency, a language flow, a grammar, a texture, a contextuality, an originality, an accuracy, a headline, a match, an addon element, an inflammatory material, an attribution, and a credit to source for evaluating a quality of the first content and the second content.

13. The method of claim 1, wherein approving of the second content comprises:
allocating to a news auditor;
submitting to the news auditor;
receiving the first rating; and
approving or rejecting the second content.

14. The method of claim 1, publishing of the second content comprises:
showing preview of the second content with the pricing and a watermark of the virtual newsroom system in a background of the second content;
displaying the first rating of the second content; and
wherein the watermark is configured to restrict an unauthorized usage of the second content.

15. The method of claim 1, wherein the publishing of the second content further comprises:
generating the recommendation of the target audience of the media outlet based upon the second content and a third location of the target audience of the media outlet.

16. The method of claim 1, wherein the enabling of at least one of the sale, the purchase, and the auction of the second content comprises:

receiving a selection from the list of the second content;
enabling the purchase of the second content;
receiving a payment detail through a payment gateway;
placing a logo as a watermark in the second content that is purchased;
generating a link to download the second content; and
sending the link to the media outlet.

17. The method of claim 1, wherein the method further comprises:
receiving an additional requirement through the media outlet;
displaying the additional requirement; and
receiving an entry from the media person, wherein the additional requirement is at least one of a vacancy and a request for a specific content.

18. The method of claim 1, wherein the method further comprises:
receiving a complaint for the second content being unethical;
allocating the complaint to an ethics committee member for checking an unethical part of the second content;
sending a notice to the approved media person informing that the second content is found to be unethical;
receiving a corrected second content through the approved media person; and
optionally removing the second content that is not corrected by the approved media person; and
optionally removing the approved media person from a database.

19. A system, comprising:
a memory; and
a processor coupled to the memory, wherein the processor is operable to:
receive, through a user registration unit, a registration of a media person, wherein the registration of the media person comprises submitting a first content;
decide through a registration approving unit the registration of the media person for one of an approval and a rejection based on a first score dynamically generated by analyzing the first content;
receive through a content receiving unit, a second content from an approved media person;
approve through an approving unit, the second content, wherein the approval of the second content is based on a second score dynamically generated, wherein a first rating of the second content and a second rating of the approved media person is dynamically updated every time the second score is generated;
publish on a publishing unit the second content;
enable, through a sales and purchase unit, at least one of a sale, a purchase, and an auction of the second content, wherein a recommendation of the second content for the purchase, to a media outlet is generated, using artificial intelligence and machine learning, based on a history of search query, a matching area of interest of the media person and the media outlet, a first location of the second content to be published by the media outlet and a target audience;
receiving a search query from a media outlet; wherein the search query comprises keywords for the first location, an area of interest, a language, and a topic;
displaying a list of the second content according to the search query received;
and
wherein the system is configured to implement a virtual newsroom system;

and wherein a pricing of the second content is dynamically changed for the media outlet according to a count of the target audience of the media outlet.

20. A non-transitory computer storage medium storing a sequence of instructions, which when executed by a processor, causes:

receiving, through a user registration unit of a virtual newsroom system, a registration of a media person, wherein the registration of the media person comprises submitting a first content;

deciding, through a registration approving unit of the virtual newsroom system, the registration of the media person for one of an approval and a rejection on a first score dynamically generated by analyzing the first content;

receiving through a content receiving unit of the virtual newsroom system, a second content from an approved media person;

approving, through an approving unit of the virtual newsroom system, the second content, wherein the approval of the second content is based on a second score dynamically generated, wherein a first rating of the second content and a second rating of the approved media person is dynamically updated every time the second score is generated;

publishing, on a publishing unit of the virtual newsroom system, the second content; and enabling, through a sales and purchase unit of the virtual newsroom system, at least one of a sale, a purchase, and an auction of the second content; wherein a recommendation of the second content for the purchase, to a media outlet is generated, using artificial intelligence and machine learning, based on a history of search query, a matching area of interest of the media person and the media outlet, a first location of the second content to be published by the media outlet and a target audience;

receiving a search query from a media outlet; wherein the search query comprises keywords for the first location, an area of interest, a language, and a topic;

displaying a list of the second content according to the search query received; and wherein a pricing of the second content that is published is dynamically changed for the media outlet according to a count of the target audience of the media outlet.

* * * * *